(12) United States Patent  (10) Patent No.: US 8,224,873 B1
Korablev et al.  (45) Date of Patent: Jul. 17, 2012

(54) SYSTEM AND METHOD FOR FLEXIBLE SECURITY ACCESS MANAGEMENT IN AN ENTERPRISE

(75) Inventors: Dmitri Korablev, Walnut Creek, CA (US); Gregory Danforth, Flagstaff, AZ (US)

(73) Assignee: Informatica Corporation, Redwood City, CA (US)

( * ) Notice: Subject to any disclaimer, the term of this patent is extended or adjusted under 35 U.S.C. 154(b) by 360 days.

(21) Appl. No.: 12/194,421

(22) Filed: Aug. 19, 2008

Related U.S. Application Data

(60) Provisional application No. 61/087,977, filed on Aug. 11, 2008, provisional application No. 61/085,815, filed on Aug. 1, 2008, provisional application No. 61/082,505, filed on Jul. 21, 2008, provisional application No. 61/082,504, filed on Jul. 21, 2008, provisional application No. 61/055,430, filed on May 22, 2008.

(51) Int. Cl.
*G06F 7/00* (2006.01)
(52) U.S. Cl. .................................................. 707/809
(58) Field of Classification Search .................. 707/809, 707/797
See application file for complete search history.

(56) References Cited

U.S. PATENT DOCUMENTS

| | | | |
|---|---|---|---|
| 5,734,887 A | 3/1998 | Kingberg et al. | |
| 5,884,325 A | 3/1999 | Bauer et al. | |
| 6,014,647 A | 1/2000 | Nizzari et al. | |
| 6,151,608 A | 11/2000 | Abrams | |
| 6,324,541 B1 | 11/2001 | de l'Etraz et al. | |
| 6,332,163 B1 | 12/2001 | Bowman-Amuah | |
| 6,345,288 B1 | 2/2002 | Reed et al. | |
| 6,477,580 B1 | 11/2002 | Bowman-Amuah | |
| 6,519,571 B1 | 2/2003 | Guheen et al. | |
| 6,523,041 B1 | 2/2003 | Morgan et al. | |
| 6,529,909 B1 | 3/2003 | Bowman-Amuah | |
| 6,529,948 B1 | 3/2003 | Bowman-Amuah | |
| 6,542,896 B1 | 4/2003 | Gruenwald | |
| 6,604,113 B1 | 8/2003 | Kenyon et al. | |
| 6,718,386 B1 | 4/2004 | Hanfland | |
| 6,839,720 B1 | 1/2005 | Thibodeau | |
| 7,356,840 B1 | 4/2008 | Bedell et al. | |

(Continued)

FOREIGN PATENT DOCUMENTS

AU      2003231931      12/2003

(Continued)

OTHER PUBLICATIONS

U.S. Appl. No. 12/194,405, filed Aug. 19, 2008, Korablev, Dmitri, et al.

(Continued)

*Primary Examiner* — Truong Vo
(74) *Attorney, Agent, or Firm* — Adeli & Tollen LLP

(57) ABSTRACT

Some embodiments provide a method and system for flexibly managing access to enterprise resources. To flexibly manage security, some embodiments secure the enterprise resources and provide a security access manager (SAM) to control access to the secured resources. The SAM controls access to the enterprise and the secure resources through one or more configurable management modules of the SAM. Each management module of the SAM is configurable to facilitate control over different security services of an enterprise security hierarchy (e.g., authentication, authorization, role mapping, etc.). Specifically, each management module is configurable to leverage security services that are provided by different security systems. In some embodiments, the management module is configured to interface with one or more adapters in order to establish the interfaces, logic, and protocols necessary to leverage the security functionality of such security systems.

24 Claims, 19 Drawing Sheets

U.S. PATENT DOCUMENTS

| | | | |
|---|---|---|---|
| 7,496,588 | B2 | 2/2009 | Wong et al. |
| 7,509,326 | B2 | 3/2009 | Krabel et al. |
| 7,523,121 | B2 | 4/2009 | Hoang et al. |
| 7,822,660 | B1 | 10/2010 | Donoho et al. |
| 2001/0051946 | A1 | 12/2001 | Nishikawa |
| 2002/0004793 | A1* | 1/2002 | Keith, Jr. ............... 707/1 |
| 2003/0065659 | A1 | 4/2003 | Agarwal et al. |
| 2003/0069780 | A1 | 4/2003 | Hailwood et al. |
| 2003/0084016 | A1 | 5/2003 | Norgaard et al. |
| 2003/0105887 | A1 | 6/2003 | Cox et al. |
| 2003/0154401 | A1* | 8/2003 | Hartman et al. ......... 713/201 |
| 2003/0167253 | A1 | 9/2003 | Meinig |
| 2003/0212654 | A1 | 11/2003 | Harper et al. |
| 2003/0217333 | A1 | 11/2003 | Smith et al. |
| 2003/0236776 | A1 | 12/2003 | Nishimura et al. |
| 2004/0006506 | A1 | 1/2004 | Hoang |
| 2004/0117358 | A1 | 6/2004 | Von Kaenel et al. |
| 2004/0243613 | A1 | 12/2004 | Pourheidari |
| 2005/0033726 | A1 | 2/2005 | Wu et al. |
| 2005/0066059 | A1 | 3/2005 | Zybura et al. |
| 2005/0149539 | A1 | 7/2005 | Cameron et al. |
| 2005/0228805 | A1 | 10/2005 | Britton et al. |
| 2005/0278270 | A1 | 12/2005 | Carr et al. |
| 2006/0036755 | A1* | 2/2006 | Abdullah et al. ......... 709/230 |
| 2006/0179027 | A1 | 8/2006 | Bechtel et al. |
| 2006/0294151 | A1 | 12/2006 | Wong et al. |
| 2007/0027898 | A1 | 2/2007 | Jones et al. |
| 2007/0156767 | A1 | 7/2007 | Hoang et al. |
| 2007/0214179 | A1 | 9/2007 | Hoang |
| 2008/0060058 | A1* | 3/2008 | Shea et al. ............ 726/4 |
| 2008/0275731 | A1 | 11/2008 | Rao et al. |
| 2009/0024589 | A1 | 1/2009 | Sood et al. |
| 2009/0182780 | A1 | 7/2009 | Wong et al. |
| 2009/0327347 | A1 | 12/2009 | Hoang et al. |

FOREIGN PATENT DOCUMENTS

| | | |
|---|---|---|
| AU | 2009222633 | 10/2009 |
| EP | 1118948 | 7/2001 |
| EP | 1509878 | 3/2005 |
| EP | 1974249 | 10/2008 |
| EP | 1974276 | 10/2008 |
| JP | 11-232327 | 8/1999 |
| WO | WO 01/15030 | 3/2001 |
| WO | WO 02/063491 | 8/2002 |
| WO | WO 03/102867 | 12/2003 |
| WO | WO 2005/064491 | 7/2005 |
| WO | WO 2007/002686 | 1/2007 |
| WO | WO 2007/079467 | 7/2007 |
| WO | WO 2007/081666 | 7/2007 |

OTHER PUBLICATIONS

U.S. Appl. No. 12/194,407, filed Aug. 19, 2008, Korablev, Dmitri, et al.

Portions of prosecution history of U.S. Appl. No. 12/194,407, Mailing Date Sep. 21, 2009, Korablev, Dmitri, et al.

Portions of prosecution history of U.S. Appl. No. 12/194,405, Mailing Date Sep. 21, 2009, Korablev, Dmitri, et al.

International Search Report for PCT/US2003/017125, Sep. 11, 2003 (mailing date), Siperian, Inc.

International Search Report and Written Opinion for PCT/US2006/025017, Jul. 31, 2007 (mailing date), Siperian, Inc.

International Preliminary Report on Patentability for PCT/US2006/025017, Jan. 17, 2008 (mailing date), Siperian, Inc.

International Search Report and Written Opinion for PCT/US2006/062721, Feb. 14, 2008 (mailing date), Siperian, Inc.

International Preliminary Report on Patentability for PCT/US2006/062721, Jul. 17, 2008 (mailing date), Siperian, Inc.

International Search Report and Written Opinion for PCT/US2007/060021, Feb. 15, 2008 (mailing date), Siperian, Inc.

International Preliminary Report on Patentability for PCT/US2007/060021, Jul. 17, 2008 (mailing date), Siperian, Inc.

Supplemental EP Search Report of EP06840362.5, Oct. 28, 2009 (mailing date), Siperian, Inc.

Supplemental EP Search Report of EP07709912.5, Oct. 28, 2009 (mailing date), Siperian, Inc.

Chieu, Trieu C., et al., "Unified Solution for Procurement Integration and B2B Stores," ACM, Sep. 2003, pp. 61-67, ACM, Pittsburg, PA.

Fung, Chun Che, et al., "Intelligent Meters for Improved System Operation and Customer Relationship Management," International Conference on Power System Technology, May 2002, pp. 1758-1762, vol. 3.

Ponniah, Paulraj, "Data Warehousing Fundamentals: A Comprehensive Guide for IT Professionals," (Month N/A) 2001, John Wiley & Sons, Inc., New York, NY.

Updated portions of prosecution history of U.S. Appl. No. 12/194,405, Mailing Date Mar. 3, 2011, Korablev, Dmitri, et al.

Walton, Cheryl, "Managing Multiple Databases," http://support.novell.com/techcenter/articles/nc1999_10b.html, Oct. 1, 1999, Novell.

Updated portions of prosecution history of 12/194,407, Mailing Date Sep. 6, 2011, Korablev, Dmitri, et al.

Updated portions of prosecution history of 12/194,405, Mailing Date Aug. 4, 2011, Korablev, Dmitri, et al.

* cited by examiner

SYSTEM AND METHOD FOR FLEXIBLE SECURITY ACCESS MANAGEMENT IN AN ENTERPRISE

CLAIM OF BENEFIT TO RELATED APPLICATIONS

This application claims the benefit of U.S. Provisional Application 61/082,505, entitled "System and Method for Flexible Security Access Management in an Enterprise," filed Jul. 21, 2008 and U.S. Provisional Application 61/085,815, entitled "System and Method for Flexible Security Access Management in an Enterprise," filed Aug. 1, 2008. The contents of all of the above mentioned applications, namely 61/082,505 and 61/085,815 are hereby incorporated by reference. This application also claims the benefit of U.S. Provisional Application 61/055,430, entitled "System and Method for Efficiently Securing Enterprise Data Fields," filed May 22, 2008; U.S. Provisional Application 61/082,504, entitled "System and Method for Efficiently Securing Enterprise Data Resources," filed Jul. 21, 2008; and U.S. Provisional Application 61/087,977, entitled "System and Method for Efficiently Securing Enterprise Data Resources," filed Aug. 11, 2008.

FIELD OF THE INVENTION

The present invention relates to the field of data management in an enterprise, and in particular, to a system and method that provides flexible security access management in an enterprise.

BACKGROUND OF THE INVENTION

In many different enterprises, multiple applications and data sources exist that create challenges in reconciling and managing a unified view of a data entity across the enterprise. For instance, data related to an entity such as customer or product is strewn across various systems (e.g., applications and data storages). Several of these systems have different data repositories and thus store their own version of the entity data. In other words, the data storages of an enterprise might store different data for a particular entity. This redundant data may cause problems for the enterprise that uses the data.

To overcome this issue, some enterprises maintain a master data set in a master data store. Master data represents the common or shared entities to the transactions that record the operations of the enterprise across the various applications and data storages. One type of master data is master reference data that represents a "best version" of the reference data stored for the particular entity in any of the data storages. The master reference data is defined by one or more attributes (e.g., fields) that are specified by the enterprise (e.g., data administrator, business user). In some enterprises, these data attributes are specified based on the reference data (i.e., data that identifies entities) of multiple different data sources. In addition to master reference data, some enterprises also maintain a "best version" relationship data (i.e., data that expresses a relationship between entities) for some or all the entities associated with the enterprise.

When an enterprise attempts data integration or data sharing via master data or some other means, a problem that arises is security access management of the integrated or shared data. A conventional approach taken by many data integration solution provider to solve the security access management program is to standardize using a single security system provided by the data integration solution provider. However, although it appears practical at a high level, this approach is not without its share of problems. For instance, standardizing on the single security system may require significant changes to an existing enterprise security system or abandoning the existing security system in order to adopt the new security system. Any such pervasive changes across an enterprise come at a significant financial cost and run the risk of breaking existing security functionality.

Additionally, standardizing to a particular security model (e.g., role-based security model, policy-based security model), as is common in the enterprise setting, fails to address the varied security needs within an enterprise setting. Specifically, a particular security model when standardized across the enterprise scales poorly. For example, an enterprise that operates with a relatively small user base is initially able to maintain a policy-based security model. However, as the enterprise grows and the user base becomes larger, the policy-based security model often becomes unmanageable because of the number of complexity of policies necessitating a fundamental change in the security structure of the enterprise and the underlying security processes. Implementing these changes is costly, time-consuming, and error prone.

Accordingly, there is need in the art for a security management system that flexibly operates with different enterprise security systems according to the varying needs of the enterprise. There is a thus a need for a flexible security access manager that integrates at different levels with new and existing enterprise security systems to provide complex security administration for the data maintained in a master data management (MDM) hub or accessed in the enterprise systems through the federated views. Specifically, the security access manager should interface with the different security systems in order to synergize and integrate the capabilities of the different security systems into a single logical security management module that can scale and adapt in a customized manner with little to no change to the underlying security processes and applications of the enterprise.

SUMMARY OF THE INVENTION

Some embodiments provide a method and system for flexibly managing access to enterprise resources (e.g., master data). To flexibly manage security, some embodiments secure the enterprise resources and provide a security access manager (SAM) to control access to the enterprise and the secured resources.

The SAM controls access to the enterprise and the secure resources through one or more configurable management modules of the SAM. Each management module of the SAM is configurable to facilitate control over different security services of an enterprise security hierarchy (e.g., authentication, authorization, role mapping, etc.). Specifically, each management module is configurable to leverage security services that are provided by one or more different security systems. In some embodiments, the management module is configured to interface with one or more adapters in order to establish the interfaces, logic, and protocols necessary to leverage the security functionality of one or more such security systems. The security systems include pre-existing security systems of the enterprise or other security systems that operate within the hub. The security systems also include external security systems from third party providers that implement various security systems.

By facilitating security services through multiple security systems, the SAM allows for distributed security access control. For instance, a management module of the SAM that performs a particular security function (e.g., authentication)

may perform that particular security function across multiple different security systems. The management module of the SAM establishes the order to query each such security system and processes the response from each such security system. In this manner, the SAM allows security administrators the ability to scale the particular security function or other security functions by seamlessly adding or removing security systems into the enterprise.

In some embodiments, a management module of the SAM is configured to operate with a new security system that compliments the security functionality provided by an existing security system in order to increase bandwidth or processing resources for a particular security functionality. In some embodiments, a management module of the SAM is configured to operate with a new security system that implements new security functionality for the enterprise. For instance, the management module is originally configured to leverage role based authorization functionality of a pre-existing security system, but is later configured to also leverage policy based authorization functionality of a third party security system.

In this manner, the SAM of some embodiments is able to leverage different policy decision points (PDP) and policy enforcement points (PEP) throughout the enterprise. Additionally, through the integration with the different security systems, the security access manager of some embodiments is further able to provide complex security administration that includes two or more security models (e.g., role-based, policy-based, etc.) to control access to the enterprise resources.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
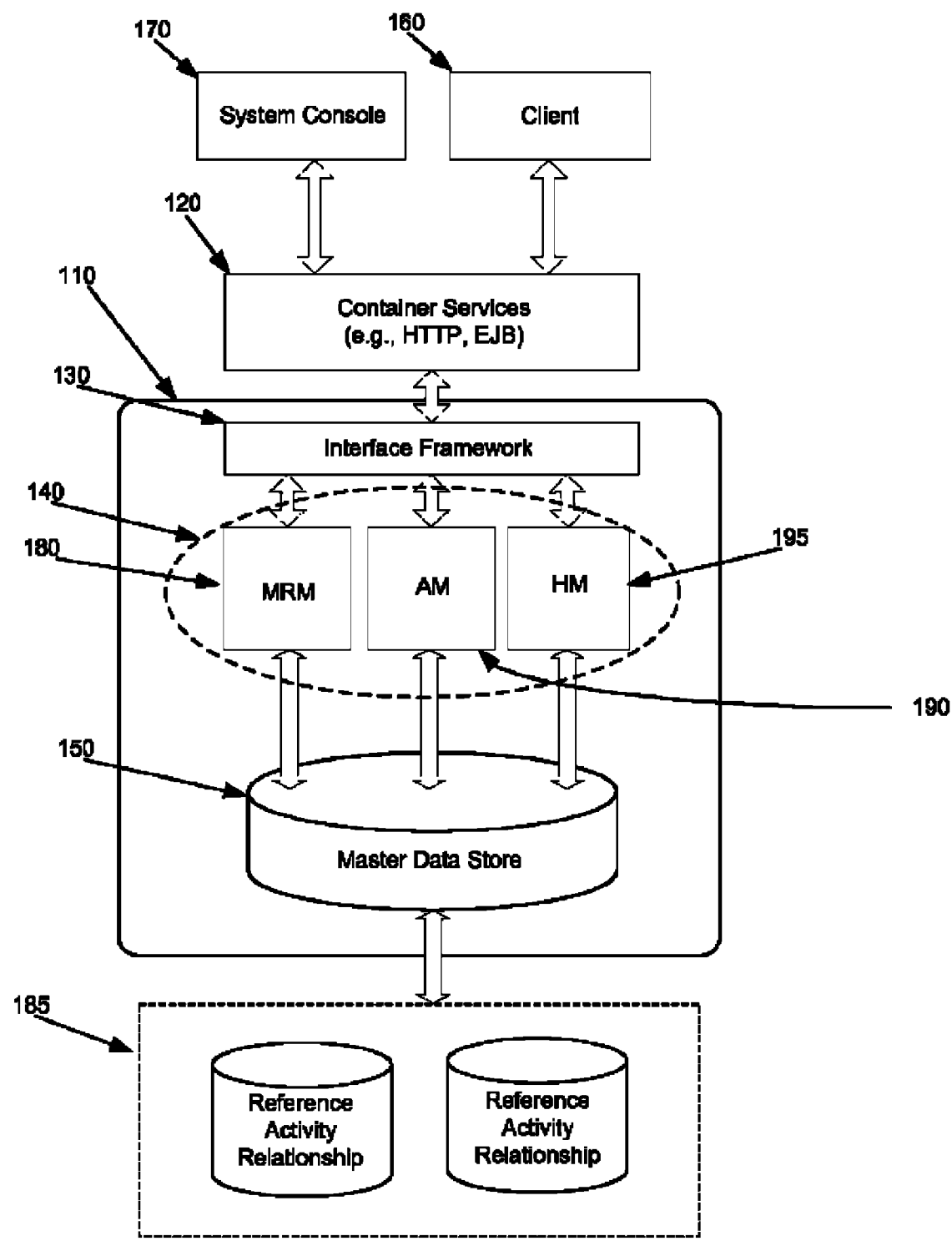
FIG. 1 presents a framework for a master data management (MDM) hub of an enterprise in which some embodiments of the invention are implemented.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Overview

Some embodiments provide a method and system for flexibly managing access to enterprise resources (e.g., master data). To flexibly manage security, some embodiments secure the enterprise resources and provide a security access manager (SAM) to control access to the enterprise and the secured resources.

The SAM controls access to the enterprise and the secure resources through one or more configurable management modules of the SAM. Each management module of the SAM is configurable to facilitate control over different security services of an enterprise security hierarchy (e.g., authentication, authorization, role mapping, etc.). Specifically, each management module is configurable to leverage security services that are provided by one or more different security systems. In some embodiments, the management module is configured to interface with one or more adapters in order to establish the interfaces, logic, and protocols necessary to leverage the security functionality of one or more such security systems. The security systems include pre-existing security systems of the enterprise or other security systems that operate within the hub. The security systems also include external security systems from third party providers that implement various security systems.

By facilitating security services through multiple security systems, the SAM allows for distributed security access control. For instance, a management module of the SAM that performs a particular security function (e.g., authentication) may perform that particular security function across multiple different security systems. The management module of the SAM establishes the order to query each such security system and processes the response from each such security system. In this manner, the SAM allows security administrators the ability to scale the particular security function or other security functions by seamlessly adding or removing security systems into the enterprise.

In some embodiments, a management module of the SAM is configured to operate with a new security system that compliments the security functionality provided by an existing security system in order to increase bandwidth or processing resources for a particular security functionality. In some embodiments, a management module of the SAM is configured to operate with a new security system that implements new security functionality for the enterprise. For instance, the management module is originally configured to leverage role based authorization functionality of a pre-existing security system, but is later configured to also leverage policy based authorization functionality of a third party security system.

In this manner, the SAM of some embodiments is able to leverage different policy decision points (PDP) and policy enforcement points (PEP) throughout the enterprise. Additionally, through the integration with the different security systems, the security access manager of some embodiments is further able to provide complex security administration that includes two or more security models (e.g., role-based, policy-based, etc.) to control access to the enterprise resources.

Several more detailed embodiments of the invention are described in the sections below. Before describing these embodiments further, Section II provides a conceptual architectural diagram of a master data management (MDM) hub (e.g., MDM system) implementing the security access controls of some embodiments. Next, Section III describes a data management hub that provides the security access control functionality in accordance with some embodiments of the invention. Lastly, Section IV describes a computer system which implements some of the embodiments of the invention.

II. Architecture

FIG. 1 presents a framework for a master data management (MDM) hub 110 of an enterprise that includes: (1) an interface framework 130, (2) several master data management modules 140, and (3) a master data store 150. The MDM hub 110 is seamlessly integrated into an enterprise in a manner that requires little to no modification to the existing resources of the enterprise. Additionally, some embodiments of the MDM hub 110 may be integrated into an enterprise with existing legacy data and other legacy data hubs.

Once integrated, the MDM hub 110 enables enterprises to eliminate data discrepancies across disparate data sources and applications, and to integrate their core business entity data into key business processes. The MDM hub 110 of some embodiments facilitates such functionality by maintaining a best version data (e.g., master data) for various entities (e.g., customers, employees, business entities, products, organizations, etc.) associated with the enterprise. In some enterprises, the entity data may be distributed across many operational and analytical systems and data sources (e.g., client applications, databases, data acquisition devices, or entities of the enterprise such as billing personnel, marketing personnel, sales personnel, product designers, engineers, managers, etc.). The MDM hub 110 maintains the master data sets (e.g., master data records) by receiving the entity data from the disparate data sources and storing the best version of the entity data in a master data store.

The interface framework 130 of the MDM hub 110 establishes the interfaces for executing operations against the MDM hub 110. The operation requests that are delivered through the interface framework 130 are fulfilled by one of the server modules 140 of the MDM hub 110. The server modules 140 provide any number of services. In some embodiments, the services facilitate e-commerce applications, XML Simple Object Access Protocol operations, etc. To provide such services, some embodiments of server modules 140 interact with the master data store 150. The master data store 150 may include such data as master reference data, relationship data, and cross-references or links to the other relationship, activity (e.g., transactional data), and reference data in multiple different data sources of the enterprise.

In some embodiments, the master reference manager 180 of the server modules operates separately or in conjunction with the other server modules to create and maintain the master reference data sets. In some embodiments, master reference data sets are reference data records that are shared amongst the various different operational/analytical systems and data sources within the enterprise. For example, user data may be gathered from multiple different systems within the enterprise such as from a customer service management system or a sales management system. The applications used by such systems may differ in the user information that is gathered and the format in which the information is entered. In other words, the applications or data sources may have a different data model and store their own version and/or conflicting version of entity data. Therefore, some embodiments of the master reference manager and/or any one the server modules 140 standardize the data from the different data sources prior to the data becoming part of the master data sets and being stored within the master data store 150. For instance, some embodiments perform delta detection (e.g., detecting change in data) and data cleansing (e.g., name correction, address standardization, data transformations, etc). In this manner, the MDM hub 110 ensures data consistency, proper data formatting, bounds checking, and data merging seamlessly throughout the enterprise as if the multiple data sources acted as a single data source.

As illustrated in FIG. 1, some examples of the one or more server modules 140 of the MDM hub 110 include a master reference manager (MRM) 180, activity manager (AM) 190, and hierarchy manager (HM) 195. The MRM 180 manages reference data or data that identifies an entity. The activity manager 190 facilitates access to the transactional data or data related to the interaction of the entity stored in the external enterprise systems. In addition, the hierarchy manager 195 manages relationship data or data that expresses a relationship that an entity such as a person or organization has with one or more other entities. Together these modules facilitate the logic for creating and accessing various different types of data whether they are stored in the master data store 150 or distributed across the different data storages of the enterprise.

Client applications 160 and system administrators 170 access the MDM hub 110 through the various interfaces and protocols provided by container services 120. The container services 120 of the MDM hub may be provided through standard application server interfaces (e.g., Enterprise Java-Bean) and/or HTTP interfaces. Specifically, the interface framework 130 interfaces with the container services 120 in order to receive requests for defining, querying, updating, and managing master data within the master data store 150. In some embodiments, the J2EE container services 120 provides a standard interface through which different client applications are able to view and update entity data that are stored in other data storages 185 across the enterprise. Some embodiments of the container services 120 include a Hypertext Transfer Protocol (HTTP), EJB, Remote Method Invocation (RMI), IIOP, SOAP, JMS interfaces, etc.

Figure 2:
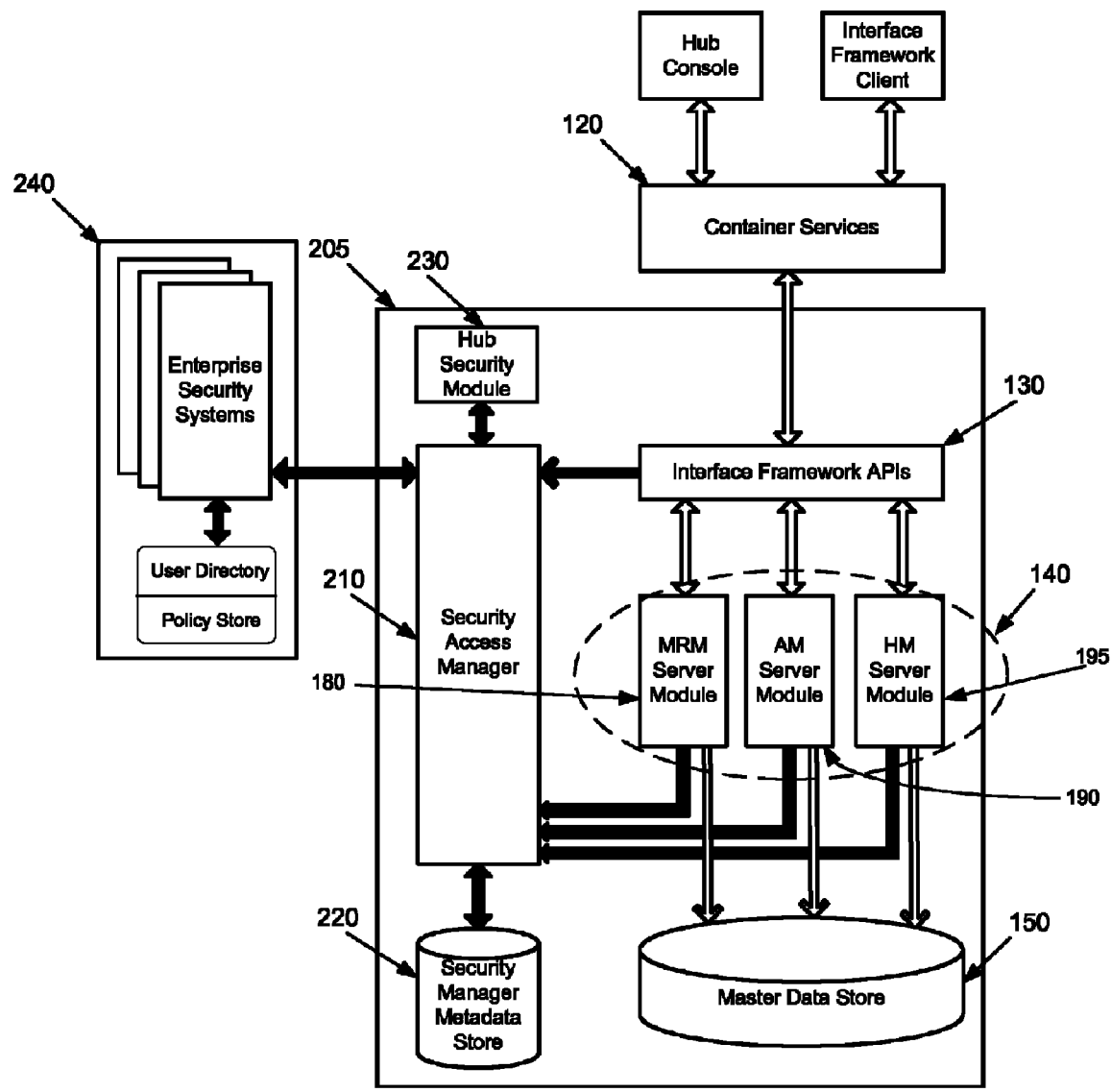
FIG. 2 illustrates including functionality of a security access manager (SAM) into the MDM hub of FIG. 1 in accordance with some embodiments.

FIG. 2 illustrates including functionality of a security access manager (SAM) into the MDM hub 110 of FIG. 1 in accordance with some embodiments. In some embodiments, the SAM 210 manages the security access control functionality (e.g., authentication, authorization, etc.) for the MDM hub 205 and manages access to the secure resources of an enterprise (e.g., master reference data, activity data, relationship data, etc.). In some embodiments, the secure resources include physical resources and/or logical secure resources (i.e., virtual secure resources) as described in the U.S. patent application Ser. No. 12/194,407 filed Aug. 19, 2007.

In this figure, the MDM hub 205 includes a security manager metadata store 220 that stores the metadata for security control. In some embodiments, the security manager metadata store 220 stores user data such as username and password used for user authentication. In some embodiments, the security manager metadata store 220 stores the various roles and/or security policies defined for the users accessing the secured enterprise resources. Such data can be used to validate user entitlements retrieved from the enterprise security systems 240, or to perform authorization without the services of the enterprise security systems.

In some embodiments, the SAM 210 is integrated into an MDM hub that is implemented using Java 2 Enterprise Edition (J2EE) application server technology such as WebSphere®, WebLogic®, or JBoss®. One way in which SAM leverages existing security functionality is by interfacing with a hub security module. This hub security module 230 may be an application server security module or an MDM hub security module that is already set up to manage security. In such cases, the SAM directly or indirectly interfaces with the hub security module 230 rather than re-implement the security system that is already in place.

In some embodiments, the SAM 210 also leverages the security functionality of one or more enterprise security systems 240 by directly interfacing with different enterprise security systems. Specifically, each of the security systems 240 may provide different levels of security functionality. For instance, one enterprise security system may only perform authentication of users or groups while another enterprise security system may perform both authentication and authorization (e.g., role assignment, policy assignment). However, by using the SAM 210 to leverage the disparate security functionality provided by each such system 240 and/or the hub security module 230, the SAM 210 is able to provide customized security functionality for the MDM hub 205.

Figure 4:
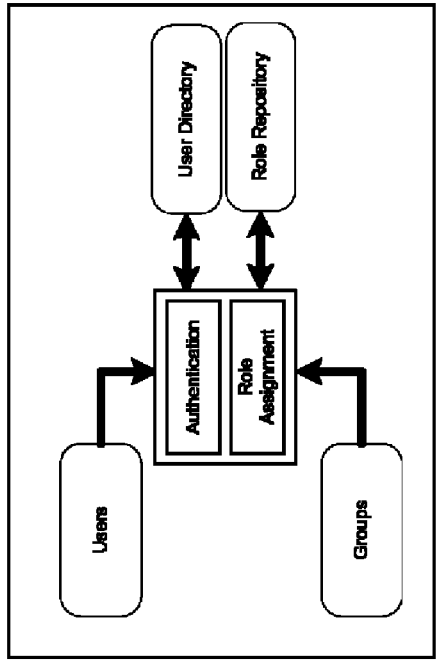
FIG. 4 illustrates an enterprise security system that authenticates users or groups against an enterprise directory and also authorizes the users or groups against an enterprise role repository.
Figure 5:
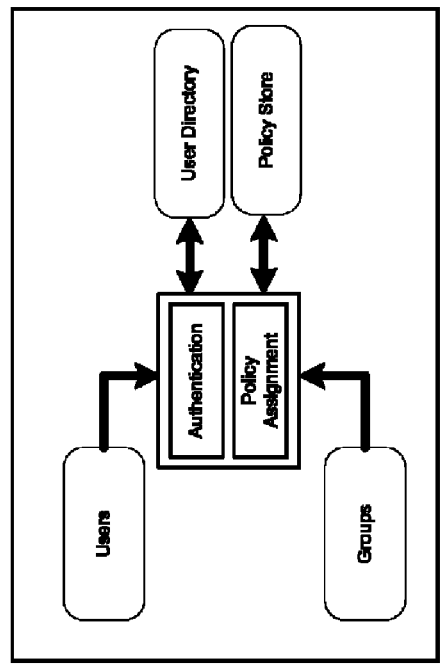
FIG. 5 illustrates an enterprise security system that authenticates users or groups against an enterprise directory and also authorizes the users or groups through user profile assignments, such as policy assignments.
Figure 3:
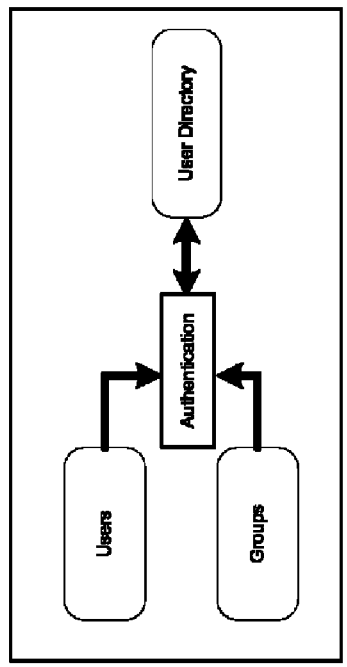
FIG. 3 illustrates an enterprise security system that authenticates users or groups against an enterprise directory.

FIGS. 3-5 illustrate several examples of different types of enterprise security systems and the corresponding security functionality provided by these various security systems. As will be described below, some embodiments of the SAM are flexible to operate in conjunction with any such enterprise security system.

FIG. 3 illustrates an enterprise security system that authenticates users against an enterprise directory. In some embodiments, security access authentication includes validating the identity of a user or group. A validated identity determines that the user is who he claims to be. In other words, the validated identity does not determine whether the user has access to any of the enterprise resource but only confirms the identity of the user. Authentication typically occurs by a username and password combination. For instance, the security system of FIG. 3 may perform authentication externally using a Java Authentication and Authorization Service (JAAS) login module (e.g., LDAP or Kerberos). This enterprise security system provides external authentication by authenticating users and/or groups against an enterprise user directories. Examples of such directories include implementations of the Lightweight Directory Access Protocol (LDAP), IBM® Tivoli Directory Server, and OpenLDAP.

FIG. 4 illustrates an enterprise security system that authenticates a user or group against an enterprise directory and also authorizes the user or group against an enterprise role repository. Whereas authentication validates the user identity, authorization specifies whether a user has the required privileges for accessing the enterprise resources. Therefore, once the security system authenticates a user, the security system identifies the enterprise roles associated with the user. In a role-based access control model, roles are configured to specify certain level of access to the various entities of the enterprise based on the operations or functions performed by a particular business function in the enterprise. Each role defines specific access privileges (e.g., read, write, merge, etc.) to the various secure resources. Users are assigned roles instead of being directly given privileges to the resources in order to reduce the administration effort and reduce the complexity. A specific user may be assigned multiple roles depending on his or her function.

Role-based access control provides security administration with a low overhead cost. A security administrator need not specify access rights for each user that enters or leaves the enterprise. Instead, the security administrator assigns a role to the user or a group of users and access rights are automatically associated with the role. FIG. 5 illustrates an enterprise security system that authenticates a user or group against an enterprise directory and also authorizes the user or group through user profile assignments, such as policy assignments. The policies associated with the authenticated user can be used to restrict access rights of the user. Thus, FIG. 5 is an example of an enterprise security system that implements a policy-based access control model.

A policy-based access control model is an alternative security model to the above described role-based security model. Unlike role-based access control, policy-based access control provides any desired level of access control over data items managed by an MDM hub or other data items of the enterprise. In some embodiments, the data items represent data objects that include one or more data attributes with data instances as values for the data attributes. In some embodiments, each data object is one or more related database tables, the data attributes are columns of those tables, and the rows are instances of the data objects. However, it should be apparent that in some embodiments the data items represent other data resources, data structures, or data groupings of the enterprise. The policy-based access control model provides a security administrator with the ability to customize the access permissions to the data fields and data objects by defining different rules or policies to apply to the different data fields, data objects, or users accessing the data.

It should be apparent to one of ordinary skill in the art that each of the enterprise security systems presented in FIGS. 3-5, though portrayed as a single enterprise security system, may include several enterprise security systems that operate in conjunction with another to provide the above described functionality. For instance, a first enterprise security system may provide authentication services while a second enterprise security system may provide authorization services.

Since the hub security module is limited in its ability to integrate with enterprise security system or may vary in its functionality depending on the type of application server, some embodiments of the SAM provide the flexibility to integrate with one or more such enterprise security systems. In this manner, the SAM expands and customizes the security functionality of the MDM hub by allowing different enterprise security functionality to be incorporated as needed. Specifically, by allowing the existing or future enterprise security system to perform either or both the authentication and authorization, the SAM not only allows the existing security system to be used as they are but allows to the existing security system to be scaled according to the security requirements of the enterprise. This is done without interrupting the existing security systems of the enterprise and without imposing the overhead cost required in replacing the existing security system with another security system.

III. Integration Models for the Security Access Manager

As noted above, the SAM is a module that operates with one or more security systems in order to provide different security functionality depending on the needs of an enterprise. Such flexibility is needed in order to integrate the SAM with hub internal security systems and third party security systems existing outside the enterprise. Each of these security systems provide some security functionality (e.g., authentication, authorization, role mapping, etc.) that is desirable by different enterprises. Additionally, each of these security systems may provide security functionality that compliments the security functionality provided by another security system (e.g., first and second levels of authentication) or may provide different security functionality from the security functionality provided by another security system, such as different authentication functionality or different authorization functionality (e.g., role-based security and policy-based security).

Figure 6:
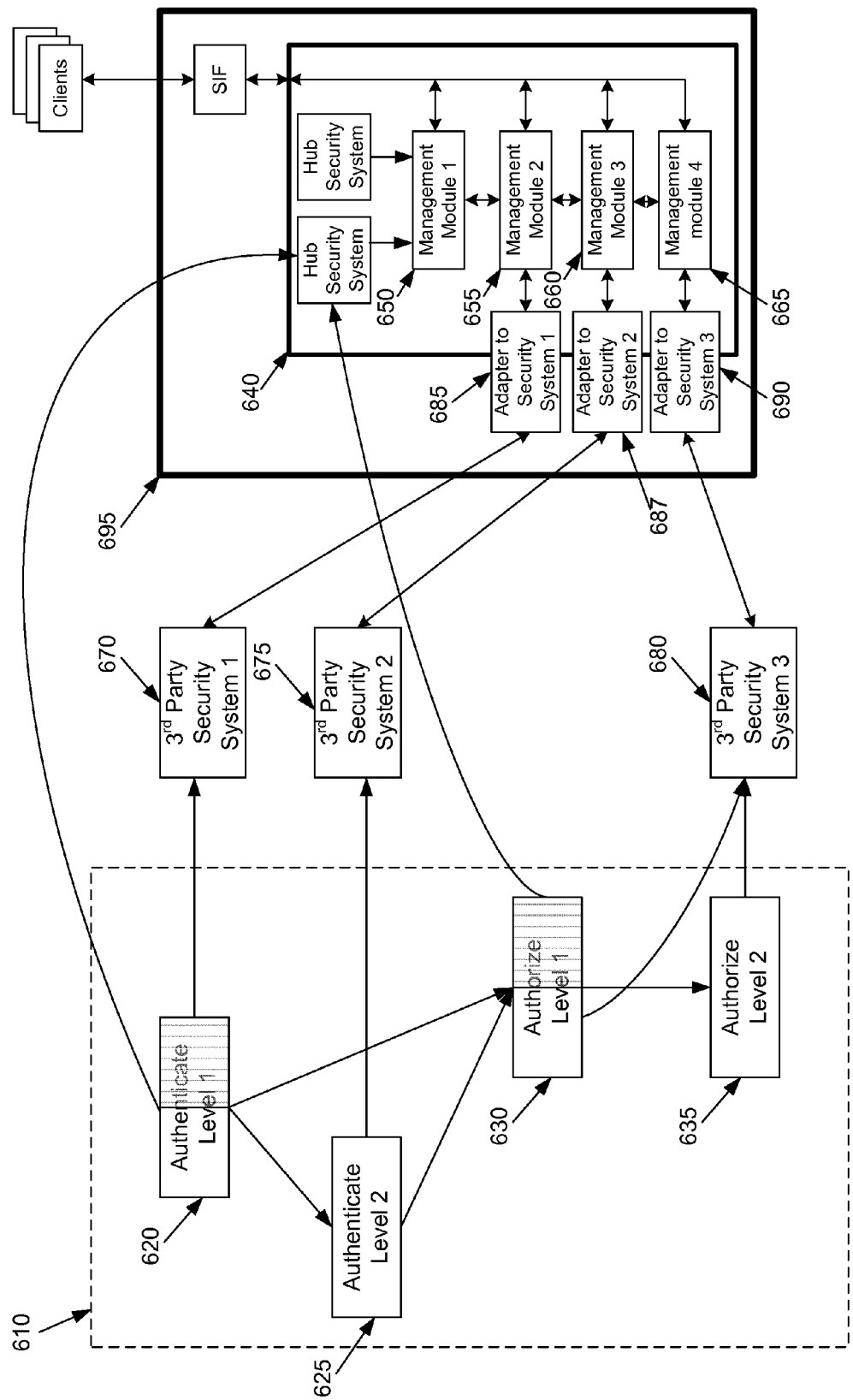
FIG. 6 illustrates a SAM that includes several management modules configured to support different operations at different levels of a security hierarchy in accordance with some embodiments of the invention.

By creating a framework to integrate any such security system into an MDM hub of an enterprise, the SAM of some embodiments is able to reduce the integration effort, expedite the time needed for the integration effort, and adapt to the security requirements according to the security needs of the enterprise. The scalable framework allows for the SAM to configurably perform different operations at different levels of a security hierarchy. The scalable framework includes one or more configurable management modules, each management module responsible for performing operations at one or more levels of the security hierarchy. FIG. 6 illustrates a SAM that includes several management modules configured to support different operations at different levels of a security hierarchy in accordance with some embodiments of the invention.

The security hierarchy 610 includes four different levels of security operations: (1) level 1 authentication 620, (2) level 2 authentication 625, (3) level 1 authorization 630, and (4) level 2 authorization 635. In some embodiments, level 1 authentication 620 involves authentication performed against an enterprise department directory (e.g., human resources department) and level 2 authentication 625 involves authentication performed against an enterprise security directory. In some embodiments, level 1 authentication 620 involves performing authentication via a first identifier (e.g., email address) and level 2 authentication 625 involves performing authentication via a second identifier (e.g., employee identification number). It should be apparent to one of ordinary skill in the art that each of the different levels of authentication and authorization depicted in the security hierarchy 610 of FIG. 6 may include any combination of authentication and authorization security services and as such is not limited by the examples provided above.

Each of the different operations for the different levels 620-635 of the security hierarchy 610 are implemented through a management module of SAM 640. Specifically, a first management module 650 of the SAM 640 is configured to perform a subset of the authentication operations for level 1 authentication 620 by using internal security functionality of the hub 695. A second management module 655 of the SAM 640 is configured to perform the second subset of the authentication operations for level 1 authentication 620 by leveraging security functionality of a third party security system 670 that interfaces with the SAM 640 through an adapter plug-in module 685 to the third party security system 670. Similarly, operations for level 2 authentication 625 are facilitated through a third management module 660 of the SAM 640 that is configured to interface with a third party security system 675 using adapter 687.

The operations for level 1 authorization 630 of the security hierarchy are split such that the SAM 640 performs a first subset of the operations using the hub security system 695 while forgoing a second subset in lieu of a third party security system 680 that interfaces with the management module 665 of the SAM 640 through the adapter 690. The third party security system 680 also performs the security operations for level 2 authorization 635 of the security hierarchy 610. In some embodiments, the third party security systems include enterprise security systems that are external to the enterprise.

Figure 7:
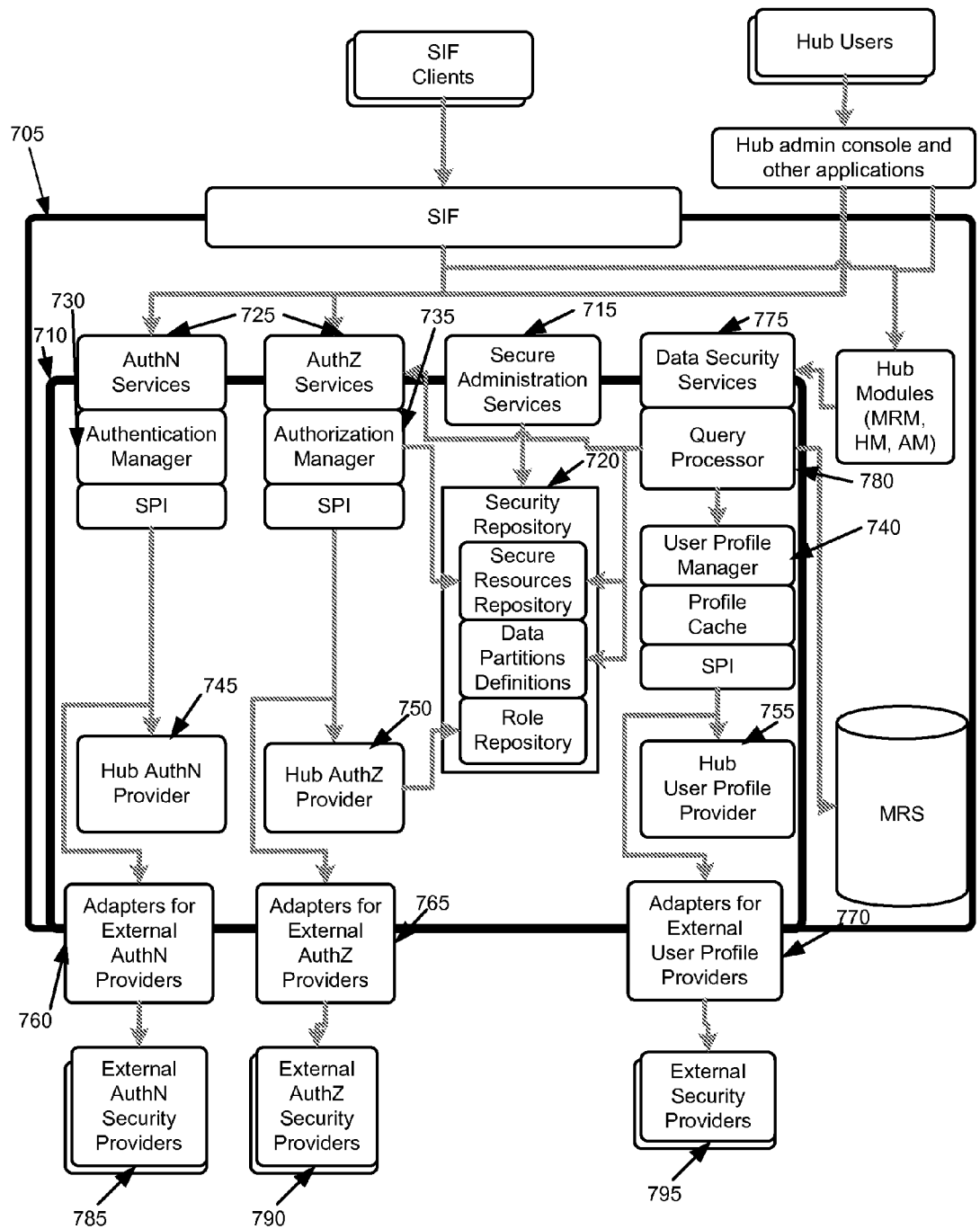
FIG. 7 presents a more detailed illustration of the SAM and its interworking with various plug-ins to provide a flexible framework that configurably performs security functionality for an enterprise.

FIG. 7 presents a more detailed illustration of the SAM and its interworking with various plug-ins to provide the flexible framework that configurably performs security functionality over a set of secure resources. The SAM 710, as shown in the context of a data management hub 705 (e.g., MDM hub), includes: (1) secure administration services 715, (2) a security repository 720, (3) various authentication and authorization services 725, (4) configurable management modules 730-740, (5) plug-in modules 745-770, (6) data security services 775, and (7) a query processor 780.

The secure administration services 715 provide the one or more interfaces for performing security administration over the secure resources managed by the SAM 710. These services 715 and the corresponding interfaces allow system administrators the ability to define, configure, and create secure resources such as the logical partitions and the virtual security objects described in the U.S. patent application Ser. No. 12/194,407 filed Aug. 19, 2007.

Once created, the secure resources are stored within the security repository 720. The security repository 720 includes a secure resources repository, definitions for the logical data partitions, and a role repository.

In some embodiments, the SAM 710 performs various security operations within a security hierarchy. Different service modules (e.g., authentication services and authorization services 725) provide the interfaces into the SAM 710 for processing these and other runtime security operations. Each interface includes a configurable management module 730-740.

Each configurable management module 730-740 includes a system provider interface (SPI) that establishes a communication pathway between the particular management module and one or more plug-ins 745-770 of the SAM 710. The plug-ins 745-755 are hub internal security systems and the plug-ins 760-770 are adapters to external enterprise security systems 785-795.

In some embodiments, the SAM 710 can be configured to interwork with these security systems 745-755 or 785-795. Specifically, each management module 730-740 of the SAM 710 can be configured to manage the processing of one or more levels or sets of security operations within the security hierarchy by leveraging the security functionality provided by some or all such security systems 745-755 or 785-795. In this figure, the management module 730 is configured as an authentication manager that facilitates authentication services for the SAM, the management module 735 is configured as an authorization manager that facilitates authorization services for the SAM, and the management module 740 is configured as a profile manager that manages user profiles.

As noted above, in some embodiments, configuring a particular management module involves specifying a hierarchical ordering by which to perform one or more security operations using one or more security systems. For instance, a particular management module may be configured to operate with first and second authentication providing security systems. Therefore, the particular management module may be configured so that authentication requests are first submitted to the first authentication providing security system, then if authentication cannot be completed by the first authentication providing security system, the particular management module submits the authentication requests to be performed by the second authentication security system. Configuring the management module therefore also includes configuring the management of the distribution of the requests and the management of the responses received from each plug-in.

In some embodiments, the adapter plug-ins 760-770 permit the SAM 710 to communicate with and leverage the security functionality provided by any number of external security systems. The adapters 760-770 convert the individual interfaces, protocols, and messages used by the various security systems to interfaces, protocols, and messages that are compatible with the SAM 710. Accordingly, the SAM 710 may initially support some set of security systems, but by using one or more adapters, the SAM is scalable to support a much larger set of security systems. In this manner, the SAM 710, through its various management modules 730-740, provides a single point within the enterprise whereby all security control for the enterprise is managed.

The SAM of some embodiments includes a mechanism by which to register the various types of plug-ins. Additionally, the SAM will resolve conflicts that may occur between the functionality of different plug-ins and different management modules. The SAM facilitates deploying the functionality of each plug-in module without incurring downtime to existing services and modules. For example, an existing authentication services module of the enterprise may operate while a new enterprise security system that provides authentication services is configured. Once the enterprise security system is configured and tested, the SAM activates the enterprise security system which then takes over the authentication services from the existing authentication module. Similarly, maintenance may be performed to existing security systems by disabling the functionality of such systems when performing the upgrade. In some embodiments, the SAM disables the functionality of a security system by configuring a management module to divert the security requests to one or more other security systems. Once the maintenance is complete, the SAM can then reconfigure the management module to bring the disabled security system back online.

In some embodiments, the data security services 775 provide the security interface for securing user queries against the secure resources. Specifically, users submitting queries to access data resources of the hub will be intercepted and processed by the SAM before execution over the data resources of the hub. The intercepted queries are passed to the query processor 780. In some embodiments, the query processor 780 modifies the queries such that the queries are performed over the secure resources defined for the enterprise. In some such embodiments, the query processor 780 modifies the queries to implement policy based security access controls defined within the data partitions definitions of the security repository 720. These policies are identified based on user roles within the role repository of the security repository 720.

This scalable framework of the SAM permits an enterprise to adapt additional or modified security functionality to an already existing standardized security model. For example, an enterprise that has standardized to a role-based security access model is able to integrate a policy-based security access model into the enterprise with little to no change to the existing security model through the functionality provided by the SAM. Similarly, an enterprise is able to upgrade authentication services without disrupting existing services and functionality in the enterprise by integrating the SAM of some embodiments and configuring the management modules of the SAM to leverage the security functionality provided by other authentication security systems.

A. Internal Authentication and Authorization

Figure 8:
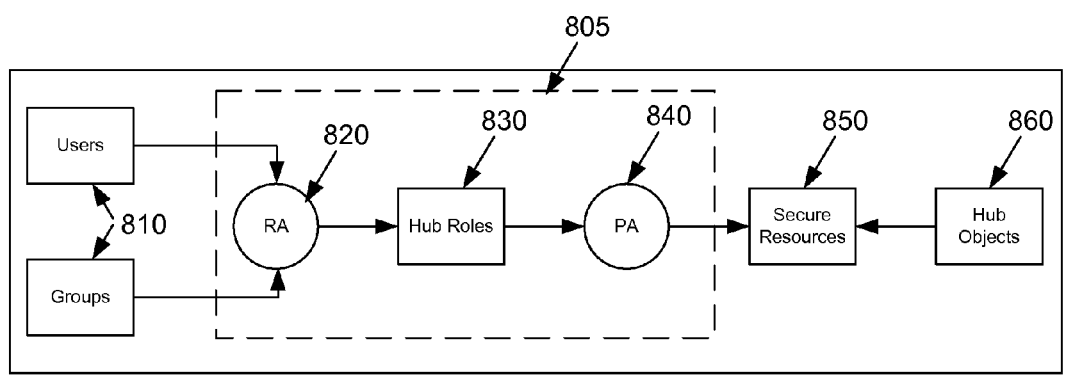
FIG. 8 illustrates an integration model of the SAM with all security functionality (e.g., authentication and authorization) being provided for internally within the MDM hub by the SAM.
Figure 9:
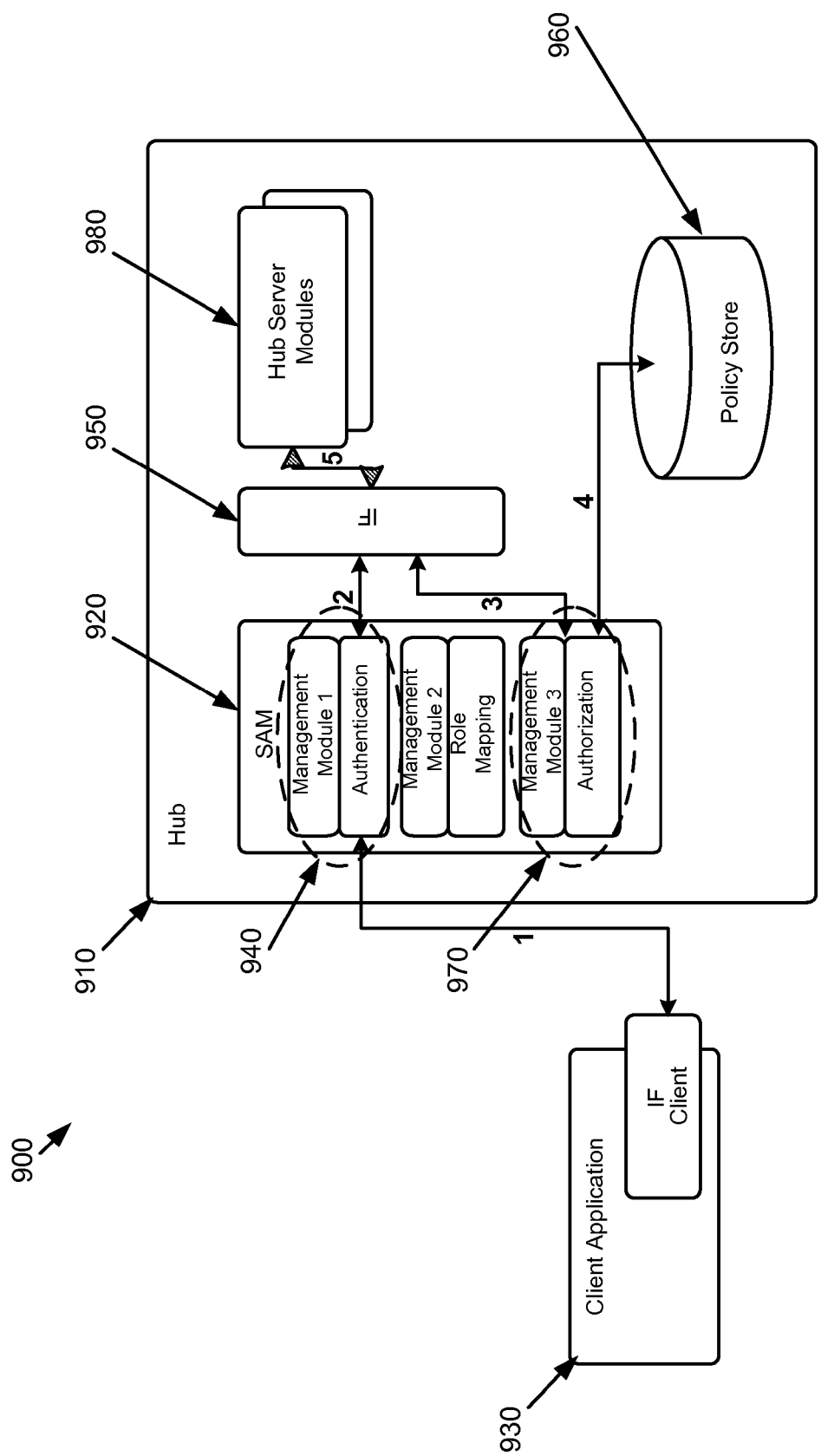
FIG. 9 conceptually illustrates a data flow for when the security functionality is provided for internally within the MDM hub and all security controls are implemented using the SAM as shown above with reference to FIG. 8.
Figure 10:
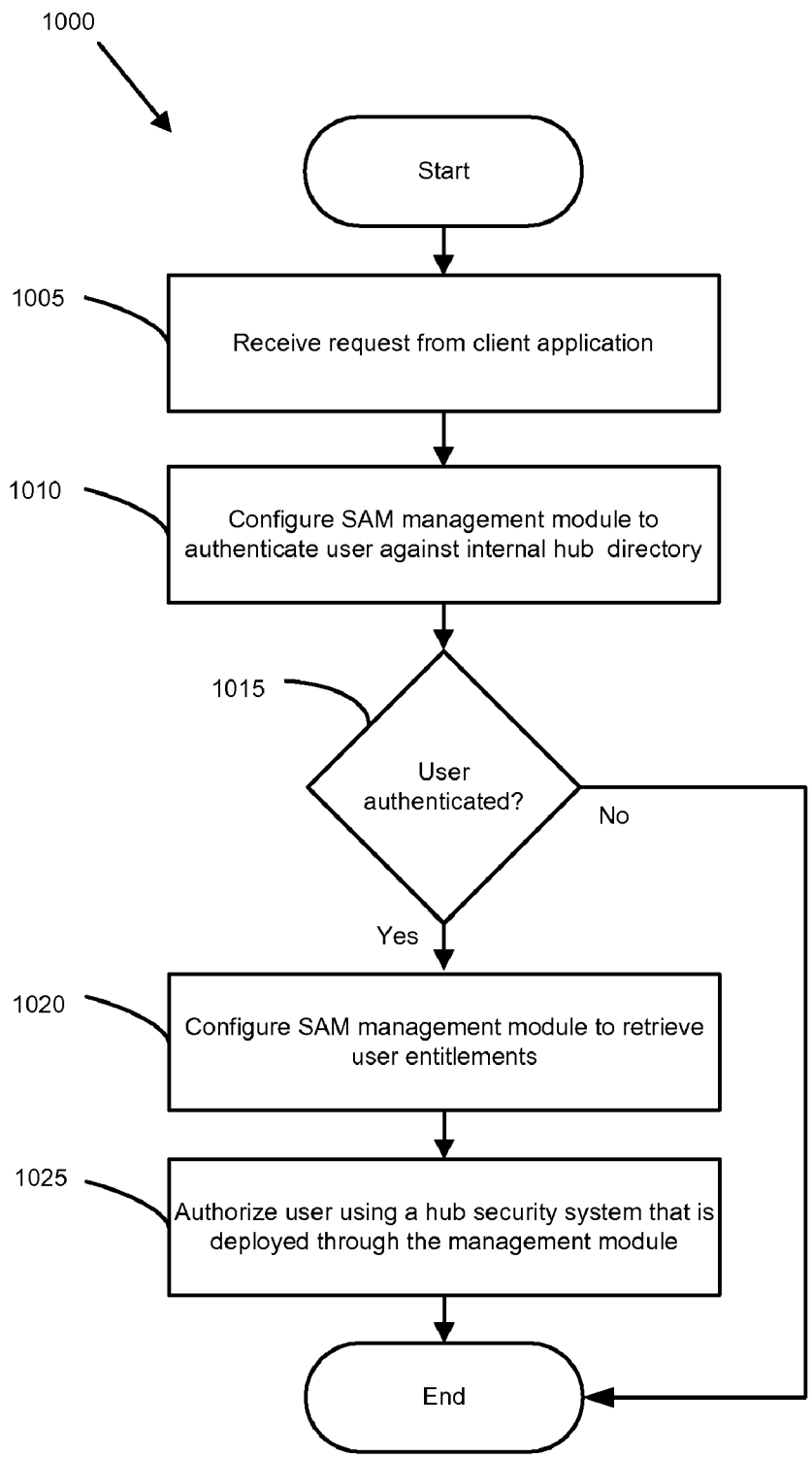
FIG. 10 presents a process performed by the SAM when the SAM leverages hub internal security systems to provide authentication and authorization services.

FIGS. 8-10 provide illustrative examples of how a SAM of some embodiments manages security by internally providing authenticating and authorizing services. In FIG. 8, all security functionality (e.g., authentication, authorization, etc.) is provided for internally within the MDM hub and all security controls are implemented using the SAM 805. Accordingly in some such embodiments, the SAM 805 performs the authentication of users by configuring one or more management modules of the SAM 805 to leverage security functionality provided by one or more hub security systems (not shown). The SAM 805 also performs the role assignment process 820 for users and groups 810 using the internally defined set of roles 830 and the policy assignment process 840 such that all policy decisions are made in the hub using one or more hub security systems. Through these authorization processes (e.g., role assignment and policy assignment), the SAM 805 of some embodiments determines the access rights that users or groups have to the secure resources 850. In some embodiments, the secure resources 850 present a generic layer of resources defined to represent any kind of security aware objects in the hub (e.g., hub objects 860) or in the federated views managed by the hub. As described above, in some embodiments, the secure resources may include physical resources and/or logical secure resources (i.e., virtual secure resources). The secure resource may also include resources stored in a master data store (e.g., master reference data) or may include resources stored elsewhere in the enterprise but accessed through the hub modules (e.g., master reference manager, activity manager, hierarchy manager, etc.).

FIG. 9 conceptually illustrates a data flow 900 for when the security functionality is provided for internally within the MDM hub 910 and all security controls are implemented using the SAM 920 as shown above with reference to FIG. 8. The SAM 920 receives a request from a client application 930. In some embodiments, the request is accompanied by a set of credentials. The credentials include some combination of username, password, and/or a security payload containing the security context information. In some embodiments, the security payload is a binary data structure containing the information that is passed with the request by the caller and passed by SAM to one or more security provider plug-ins.

The SAM 920 attempts to authenticate the user submitting the request against a user directory. In some such embodiments where authentication is performed internally, the SAM 920 configures a management module 940 to deploy one or more plug-in hub authentication security systems to perform the authentication services. The module 940 thus manages interfacing with a user directory, searching the user directory, and validating user identities against the user directory using the one or more hub security systems.

If authentication of the user is successful, the request is passed to the interface framework 950. The interface framework 950 then authorizes the user based on user entitlements. Since the security services are provided internally within the MDM hub 910, the interface framework interfaces with the SAM 920 in order to retrieve the valid user entitlements. As shown, some embodiments of the SAM 920 identify the user entitlements from policy store 960 by configuring a management module 970 to deploy one or more plug-in hub authorization security systems (not shown) that contain the various logic, protocols, and interfaces for interfacing with the policy store 960 to authorize a user. Upon successful authorization of the user, the request is returned to the interface framework 950 where it is then passed to the appropriate server module 980 (e.g., master reference manager, activity manager, hierarchy manager) for execution.

FIG. 10 presents a process 1000 performed by the SAM when the SAM leverages hub internal security systems to provide authentication and authorization services. The process 1000 begins when the SAM receives (at 1005) a request from a client application. The SAM configures (at 1010) one or more of its management modules to authenticate a user through an internal hub security system that verifies the identity of the user against an internal user directory. In some embodiments, additional user profile provider plug-ins may be deployed in SAM to supply the user profile attributes that are used by SAM in enforcing the data security as configured in the data access policies.

If the user is not authenticated (at 1015) for access, then the request goes abandoned and the process ends. However, upon successful authentication (at 1015), the SAM then authorizes (at 1020) the user by validating the user entitlements through one or more internal hub authorization security systems. The SAM configures a management module to retrieve the user entitlements from a policy store. The retrieved user entitlements are then used to authorize (at 1025) the user against an internal hub security system that is deployed by the management module. For instance, the retrieved user entitlements are used to verify that the user has sufficient rights to execute the requested operation. Upon successful authorization, the request is passed to an appropriate hub server module for execution according to the validated user entitlements.

B. External Authentication and Internal Authorization

Figure 11:
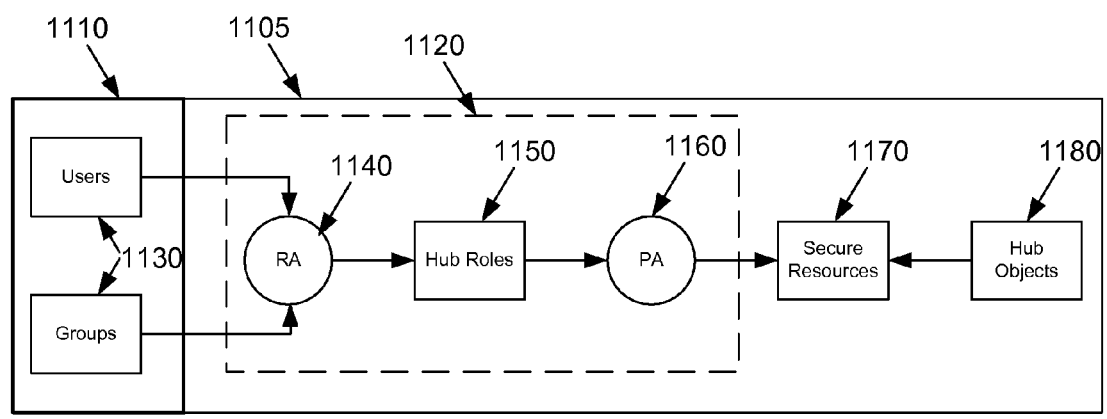
FIG. 11 illustrates the separation of authentication that is performed by the enterprise security system and the authorization (e.g., role assignment and/or policy assignment) that is performed internally within the MDM hub.
Figure 12:
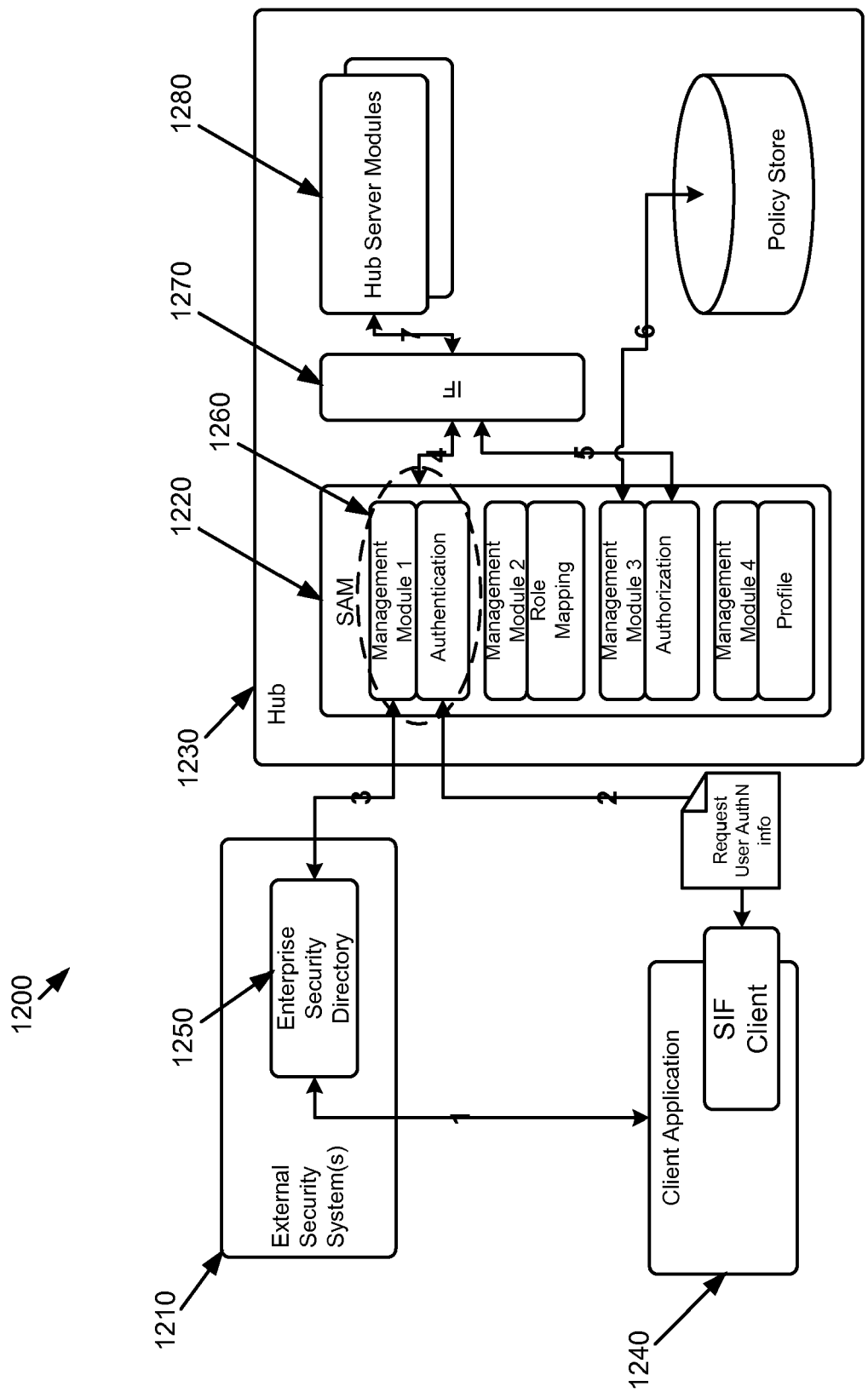
FIG. 12 conceptually illustrates a data flow for when authentication of users or groups is performed by one or more enterprise security system rather than being performed internally by the SAM.
Figure 13:
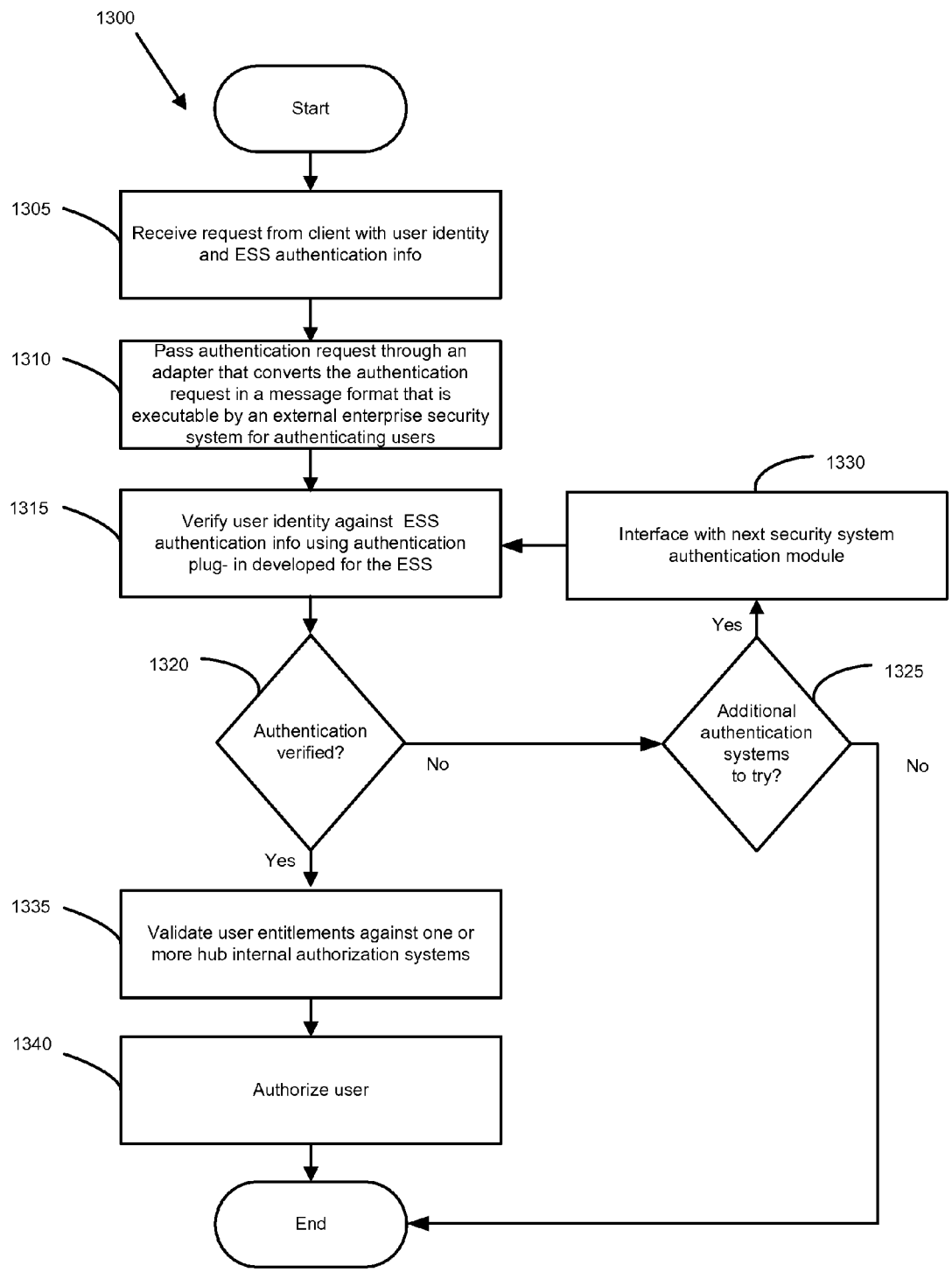
FIG. 13 presents a process performed by the SAM to leverage authentication services of an enterprise security system while also leveraging authorization services of a hub internal security system.

FIGS. 11-13 provide illustrative examples of how a SAM of some embodiments manages security by allowing one or more existing enterprise security systems to perform authorization while performing authentication through one or more internal hub security systems.

FIG. 11 illustrates the separation of authentication that is performed by the enterprise security system and the authorization (e.g., role assignment and/or policy assignment) that is performed internally within the MDM hub 1105. In FIG. 11, an enterprise security provider 1110 integrates with the SAM 1120 of the MDM hub 1105 through a configured management module of the SAM and one or more adapter plug-ins to perform the user account, profile, and group administration 1130 externally from the MDM hub 1105. The SAM 1120 then configures the same or different management module to perform (1) the role assignment process 1140 for the enterprise security provider using the defined roles 1150, (2) the general policy assignment process 1160, and (3) the management and access control for the secure resources 1170 using one or more internal hub security systems. As described above, in some embodiments, the secure resources may include physical resources and/or logical secure resources (i.e., virtual secure resources). The secure resource may also include resources stored in a master data store (e.g., master reference data) or may include resources stored elsewhere in the enterprise but accessed through the hub modules (e.g., master reference manager, activity manager, hierarchy manager).

FIG. 12 conceptually illustrates a data flow 1200 for when authentication of users or groups is performed by one or more enterprise security system 1210 rather than being performed internally within the MDM hub. In this figure, the client application 1240 authenticates the user against the enterprise security directory 1250 (e.g., user directory). The client application 1240 then issues a request to the MDM hub 1230 passing the user identity and the authentication information as part of the request parameters. The SAM 1220 receives the request and verifies the user identity against information retrieved by the enterprise security system(s) 1210. To do so, some embodiments of the SAM 1220 deploy an authentication plug-in module 1260 (i.e., internal hub security system) that contains the logic and/or protocols for interfacing with the specific enterprise security system 1210 that performs the authentication services.

After successful authentication, the request is passed to the interface framework 1270 of the MDM hub 1230. The interface framework 1270 then interfaces with the SAM 1220 to validate user entitlements before executing the request. Specifically, the validation request is passed to a management module of the SAM 1220 that is configured to service such requests. In this figure, the management module is configured to leverage validation services of one or more hub internal security systems (not shown). The management module of the SAM 1220 then authorizes the user entitlements against the hub internal security system. Upon successful authorization of the user, the request is returned to the interface framework 1270 where it is then passed to the appropriate server module for execution 1280.

FIG. 13 presents a process 1300 performed by the SAM to leverage authentication services of an enterprise security system while also leveraging authorization services of a hub internal security system. The process 1300 begins when the SAM receives (at 1305) a request with user identity and enterprise security system authentication information from a client application. A configured management module of the SAM then passes (1310) the authentication request through an adapter that converts the authentication request in a message format that is executable by an external enterprise security system for authenticating users. The SAM attempts (at 1315) to verify the user identity with the first security system. If the user cannot be authenticated (at 1320), then the management module determines (at 1325) whether additional authentication security systems should be attempted to authenticate the user. If not, the request goes abandoned and the process ends. However, if authentication is to be attempted with an additional security system, the management module of the SAM then interfaces (at 1330) with the next security system through an adapter plug-in deployed by the SAM for the next security system and authentication is again attempted at 1315.

Upon successful authentication (at 1320), a configured management module of the SAM will then authorize (at 1335) the user by validating user entitlements from a policy store using one or more internal hub authorization systems. The user is then authorized (at 1340) for a particular level of access to the secure resources of the enterprise based on the identified user entitlements. Upon successful authorization, the request is passed to an appropriate hub server module for execution according to the validated user entitlements.

C. External Authentication and Role Assignment

In some embodiments, the enterprise security systems provide additional security services beyond user authentication. For instance, in an enterprise that utilizes a role-based security access model, some embodiments of the SAM leverage the functionality of one or more enterprise security system to perform user role assignments instead of or in addition to performing authentication services for the MDM hub. Accordingly, the SAM of some embodiments provides a third integration model for integration with such systems.

Figure 14:
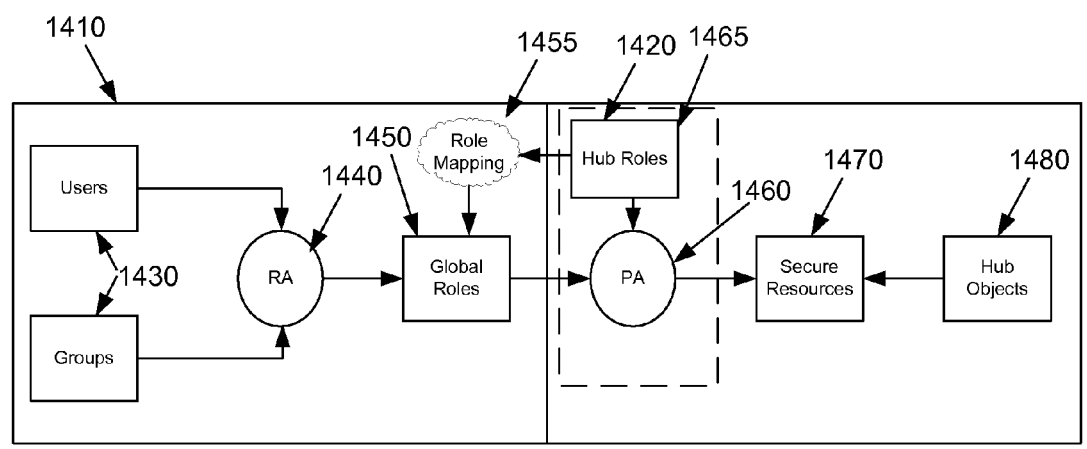
FIG. 14 illustrates how various authentication and role assignment security functionality performed by one or more enterprise security providers are integrated into the SAM.
Figure 15:
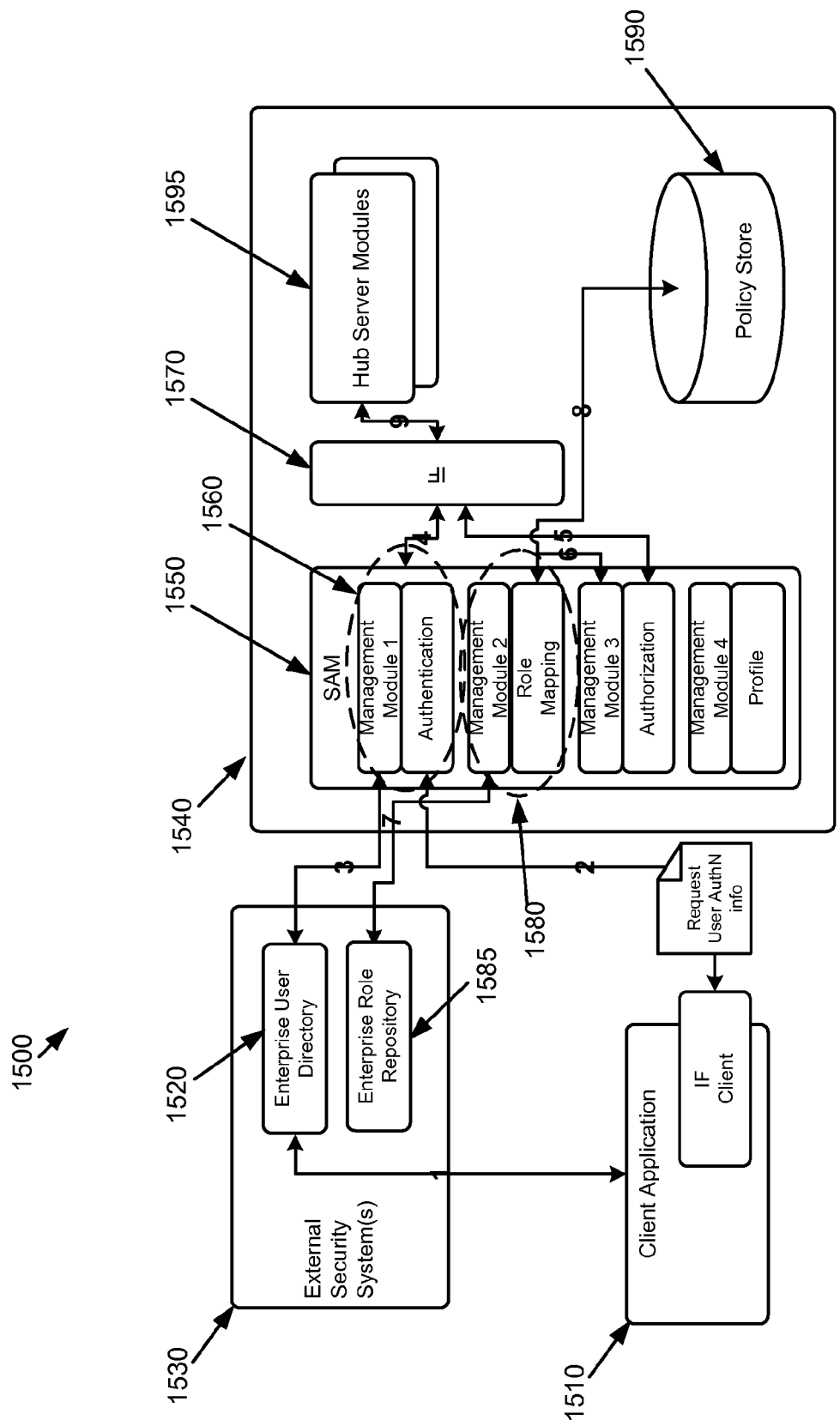
FIG. 15 conceptually illustrates a data flow for when a SAM of some embodiments leverages authentication services and role assignment services of one or more enterprise security systems.
Figure 16:
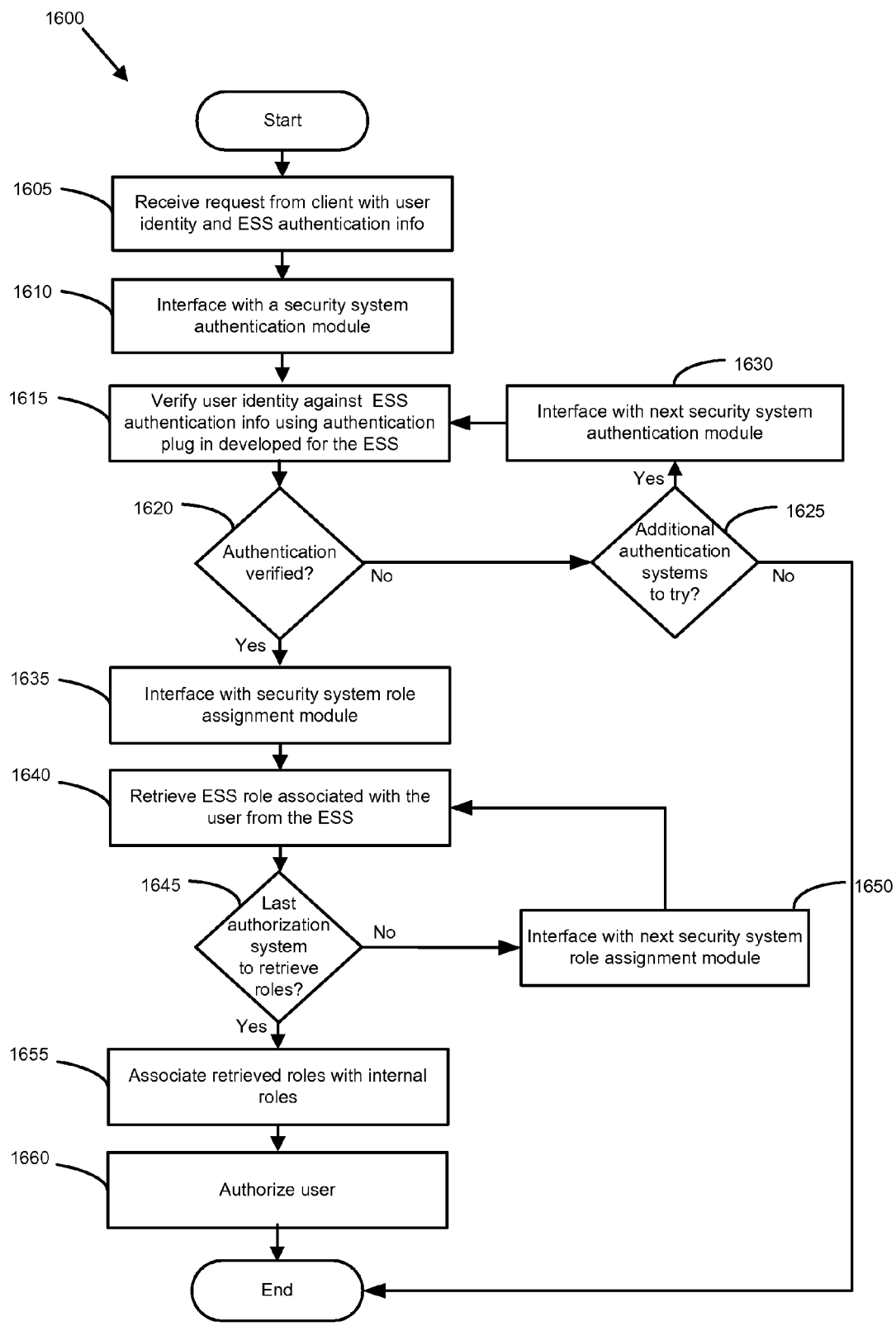
FIG. 16 presents a process performed by the SAM to leverage authentication services and role assignment services of one or more enterprise security systems.

FIGS. 14-16 provide illustrative examples of how the SAM of some embodiments manages security by providing authentication services and role assignment for the MDM hub by deploying one or more enterprise security systems to provide such services in accordance with some embodiments of the invention. FIG. 14 illustrates how various authentication and role assignment security functionality performed by one or more enterprise security providers 1410 are integrated into the SAM 1420. Since the SAM 1420 performs the security access control and manages the secure resources and data objects of the hub, the SAM 1420 includes a configured role mapping interface 1455 for synchronizing with and accessing the role assignments defined by the enterprise security provider 1410. In this manner, the SAM 1420 is able to operate in conjunction with the externally provided roles of the enterprise security provider 1410 and any roles internally defined in SAM 1465 that are within the enterprise but outside the enterprise security provider 1410. In FIG. 14, the SAM continues to manage the policy assignment 1460 and security access control over the secure resources 1470 (e.g., hub objects 1480 defined as secure resources) through hub internal security systems.

FIG. 15 conceptually illustrates a data flow for when a SAM of some embodiments leverages authentication services and role assignment services of the enterprise security systems. In this figure, a client application 1510 authenticates a user against an enterprise directory 1520 which is maintained by an enterprise security system 1530. The client application 1510 then issues a request to the MDM hub 1540 passing the user identity and the authentication information as part of the request parameters. The SAM 1550 integrated into the MDM hub 1540 receives the request. Through a management module of the SAM that is configured to interface enterprise security system 1530, the management module attempts to verify the user identity. Specifically, the management module passes the request through an adapter plug-in that converts the request into a message format executable by the security system 1530.

After successful authentication, the request is passed to the interface framework 1570 of the MDM hub 1540. The interface framework 1570 then interfaces with the SAM 1550 to validate user entitlements. The SAM 1550 authorizes the user entitlements through a role mapping provider module 1580 of the SAM 1550. In some embodiments, the role mapping provider module 1580 retrieves the roles associated with the user identity from the enterprise security system 1530. The role mapping provider module 1580 also establishes relationships between the enterprise roles 1585 and the roles defined in the internal policy store 1590. In other words, the role mapping provider maps the enterprise role to the hub roles. The retrieved roles are then used to authorize the user against one or more external authorization systems. Upon successful authorization of the user, the request is returned to the interface framework 1570 where it is then passed to the appropriate server module 1595 for execution.

FIG. 16 presents a process 1600 performed by the SAM to leverage authentication services and role assignment services of one or more enterprise security systems. The process 1600 begins when the SAM receives (at 1605) a request with user identity and enterprise security system authentication information from a client application. The SAM of some embodiments interfaces with one or more enterprise security systems to authenticate users. Accordingly, the process interfaces (at 1610) with a first security system using an authentication plug-in deployed by a management module of the SAM for the first security system. The management module attempts (at 1615) to verify the user identity with the first security system. If the user cannot be authenticated (at 1620), then the management module determines (at 1625) whether additional authentication security systems should be attempted to authenticate the user. If not, the request goes abandoned and the process ends. However, if authentication is to be attempted with an additional security system, the management module of the SAM then interfaces (at 1630) with the next security system using an authentication plug-in deployed by the management module for the next security system and authentication is again attempted at 1615.

Upon successful authentication (at 1620), a management module of the SAM then authorizes (at 1635) the user by interfacing (at 1635) with an external role assignment security system and retrieving (at 1640) roles associated with the user from enterprise security system. The management module then determines (at 1645) whether it is necessary to interface with additional security systems to retrieve additional role assignments for the user. In some embodiments, the role assignments are distributed across multiple different enterprise security systems of the enterprise. For instance, in a globally distributed enterprise where security over the data is managed on a region by region basis and the role assignments are managed and assigned on a region by region basis, each region administrator may specify different role assignments for the data particular to that region.

If it is determined (at 1645) that no additional roles are to be retrieved, the management module associates (at 1655) the retrieved roles with internal roles to specify the user entitlements for the user. The user is then authorized (at 1660) to access data and services of the enterprise according to the authorized user entitlements. Otherwise, the management module interfaces (at 1650) with the additional role assignment security systems and retrieves (at 1640) the additional roles before associating (at 1655) the roles to the user and authorizing (at 1660) the user to access services and data of the enterprise.

D. External Authentication and Policy Assignment

In some embodiments, the one or more enterprise security systems provide authentication and policy assignment security functionality that is used by the SAM of some embodiments to secure enterprise resources. In other embodiments, the one or more enterprise security systems provide authentication, role assignment, and policy assignment security functionality that are used by the SAM of some embodiments to secure enterprise resources. The SAM of some embodiments therefore provides a fourth integration model for integration with such systems where the policy assignments are externally administered. Specifically, FIGS. 17-19 provide illustrative examples of how a SAM of some embodiments manages security by providing authentication, role assignment, and policy assignment services by deploying one or more enterprise security systems in accordance with some embodiments of the invention.

Figure 17:
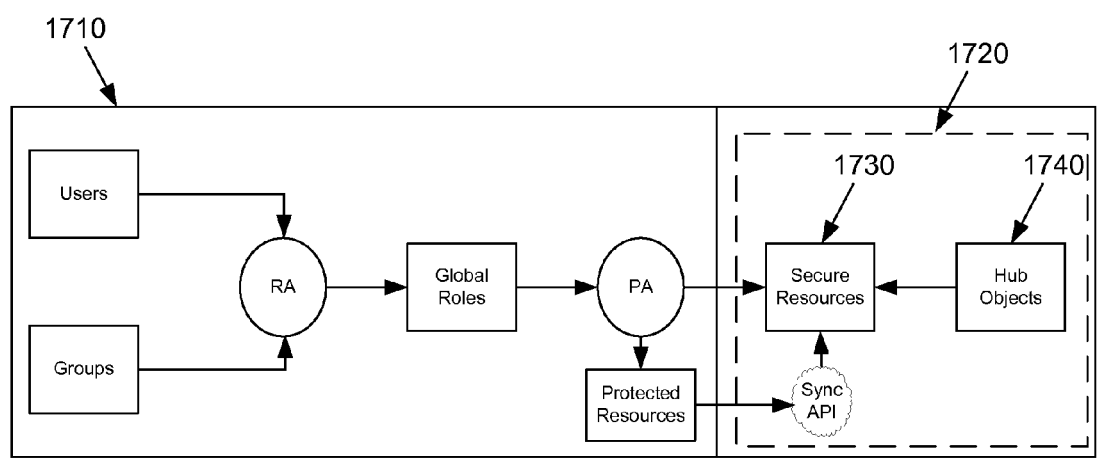
FIG. 17 illustrates how various authentication, role assignment, and policy assignment security functionality performed by one or more enterprise security providers are integrated into the SAM.

FIG. 17 illustrates how various authentication, role assignment, and policy assignment security functionality performed by one or more enterprise security providers 1710 are integrated into the SAM 1720. The SAM 1720 however maintains control over and secures access to the secure resources 1730 and physical data objects 1740 of the enterprise by enforcing the externally defined role and policies. Therefore, role definition and policy decisions are external to the MDM hub. However, the SAM exposes the protected resources based on the externally defined roles and policy decisions.

Figure 18:
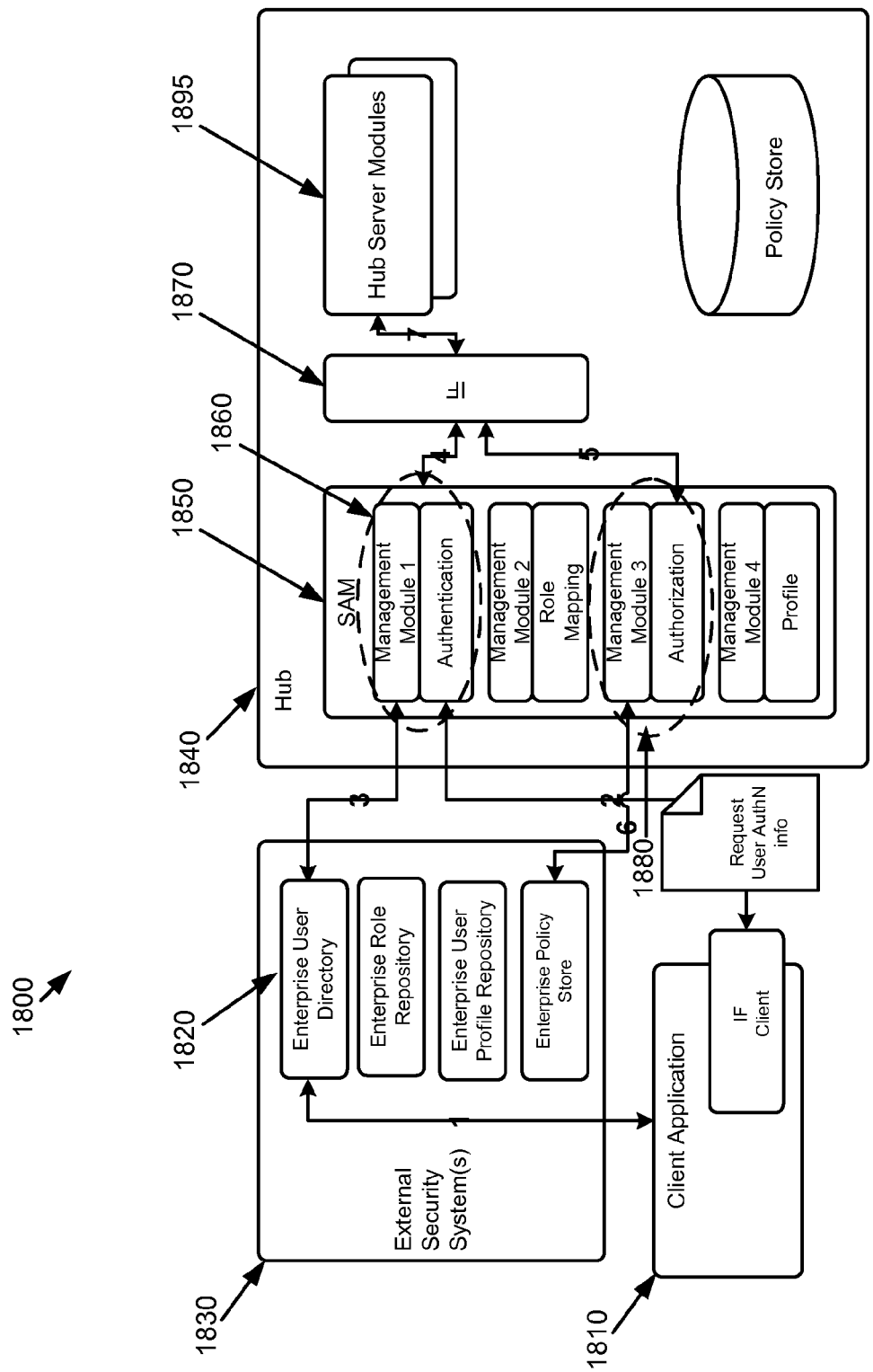
FIG. 18 conceptually illustrates a data flow for when authentication, role assignment, and policy assignment services are provided by one or more enterprise security systems that are used by the SAM of some embodiments to manage enterprise resources.
Figure 19:
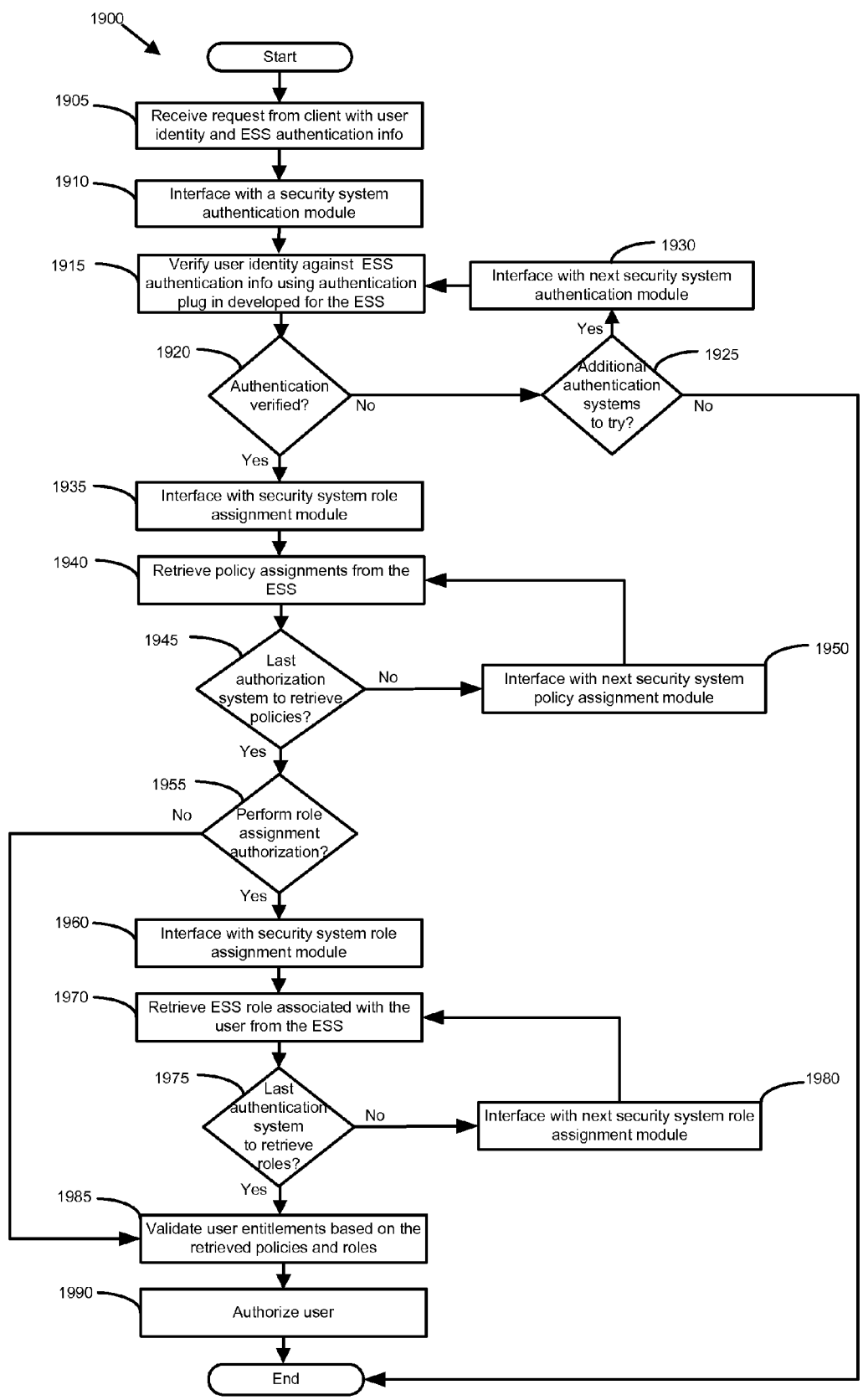
FIG. 19 presents a process performed by the SAM when one or more enterprise security systems that provide authentication, role assignment, and policy assignment services are integrated with the SAM.

FIG. 18 conceptually illustrates a data flow for when authentication, role assignment, and policy assignment services are provided by one or more enterprise security systems that are used by the SAM of some embodiments to manage enterprise resources. In this figure, a client application 1810 authenticates a user against an enterprise directory 1820 which is maintained by an enterprise security system 1830. The client application 1810 then issues a request to the MDM hub 1840 passing the user identity and the authentication information as part of the request parameters. The SAM 1850 integrated into the MDM hub 1840 receives the request and verifies the user identity against the enterprise security system 1830 using via a management module 1860 of the SAM that is configured to leverage functionality of enterprise security system 1830 through an adapter plug-in.

After successful authentication, the request is passed to the interface framework 1870 of the MDM hub 1840. The interface framework 1870 then interfaces with the SAM 1850 to validate user entitlements. The SAM 1850 authorizes the user entitlements through an authorization management module 1880 of the SAM 1850. In some embodiments, the authorization management module 1880 retrieves the roles and policies associated with the user identity from the enterprise security system 1830. It should be apparent to one of ordinary skill in the art that in an enterprise that uses only a policy-based access control model, the SAM and enterprise security system do not perform role assignments. Upon successful authorization of the user, the request is returned to the interface framework where it is then passed to the appropriate server module for execution according to the validated user entitlements.

FIG. 19 presents a process 1900 performed by the SAM when one or more enterprise security systems that provide authentication, role assignment, and policy assignment services are integrated with the SAM. As above with FIGS. 13 and 16, the process 1900 begins when the SAM receives (at 1905) a request from a client application. The SAM of some embodiments interfaces with one or more enterprise security systems to authenticate users. Accordingly, the process interfaces (at 1910) with a first security system using an authentication plug-in deployed by the SAM for the first security system. The SAM attempts (at 1915) to verify the user identity with the first security system. If the user cannot be authenticated (at 1920), then the process determines (at 1925) whether additional authentication security systems should be attempted to authenticate the user. If not, the request goes abandoned and the process ends. However, if authentication is to be attempted with an additional security system, the process then interfaces (at 1930) with the next security system using an authentication plug-in deployed by the SAM for the next security system and authentication is again attempted at 1915.

Upon successful authentication (at 1920), the SAM then authorizes (at 1935) the user by interfacing (at 1935) with an external policy assignment security system and retrieving (at 1940) policies associated with the user from enterprise security system. The process then determines (at 1945) whether additional authorization systems remain from which to retrieve additional policies.

If it is determined (at 1945) that additional policies are to be retrieved, the process interfaces (at 1950) with the next security system policy assignment module using a particular plug-in for the security system and retrieves (at 1940) the policies. Otherwise, the process then determines (at 1955) whether it is necessary to perform role assignment.

If role assignment is to be performed, then the process interfaces (at 1960) with the various security systems to retrieve (at 1965) the necessary roles from one or more security systems (at 1975 and 1980) as described above in steps 1635 through 1650 of FIG. 16. After the necessary policies and/or roles are retrieved, the process then validates (at 1985) the user entitlements based on the retrieved policies and/or roles. The user is then authorized (at 1990) to access data and services of the enterprise according to the authorized user entitlements.

Figure 20:
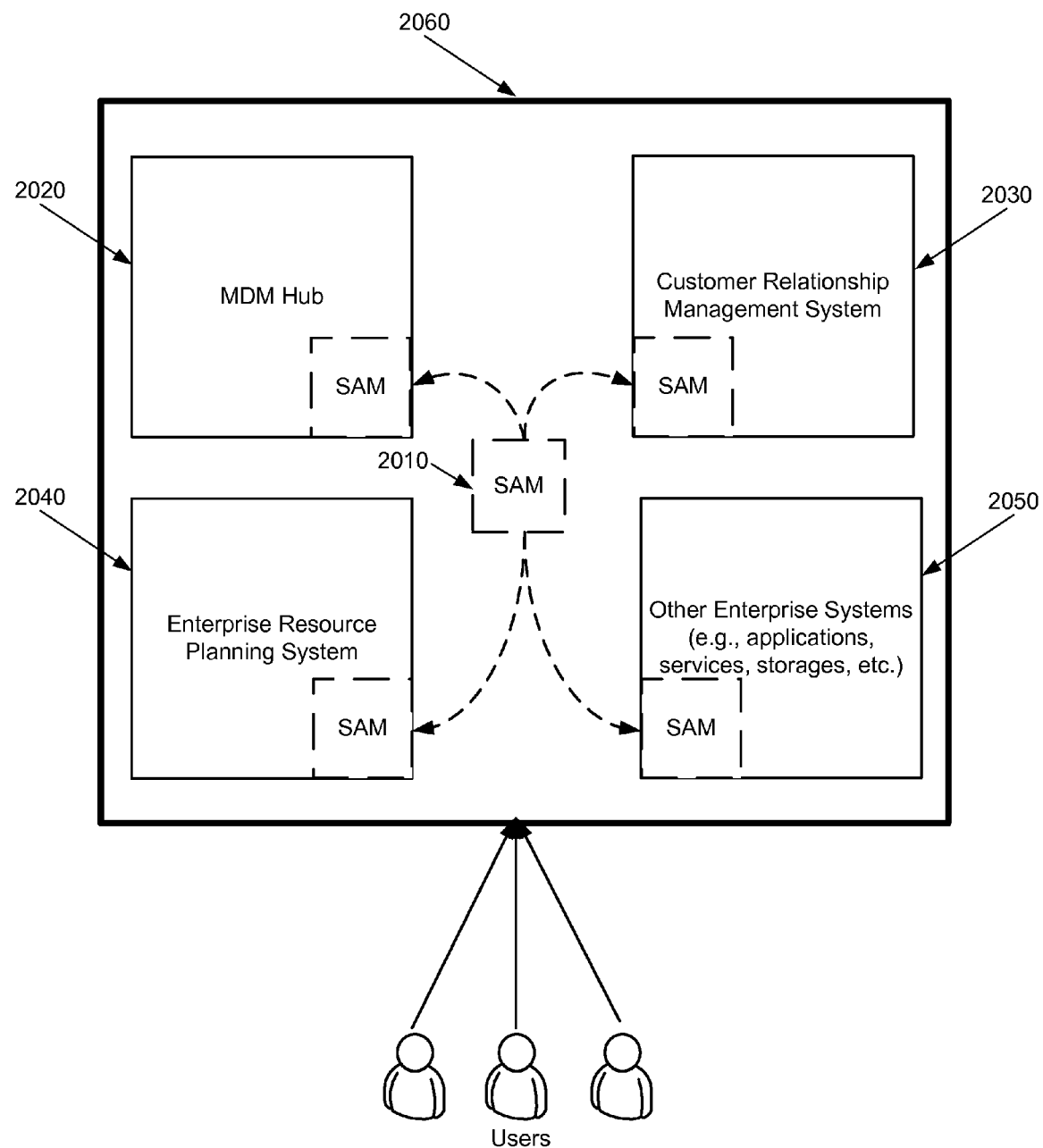
FIG. 20 illustrates different contexts by which a SAM of some embodiments may be integrated into an enterprise.

In the above examples and corresponding description, the SAM is demonstrated as a security module in the context of an MDM hub. However, it should be apparent to one of ordinary skill in the art that the SAM of some embodiments and the corresponding functionality implemented by the SAM may be positioned and used as part of other applications or resources of the enterprise. For example in FIG. 20, the SAM 2010 of some embodiments is shown in the context of either the MDM hub 2020, Customer Relationship Management (CRM) system 2030, Enterprise Resource Planning (ERP) system 2040, or other enterprise systems 2050 (e.g., applications, data sources) of the enterprise 2060.

IV. Computer System

Additionally, many of the above-described modules and processes (e.g., SAM, logical data partitions, virtual security objects) are implemented as software processes that are specified as a set of instructions recorded on a machine readable medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention.

Figure 21:
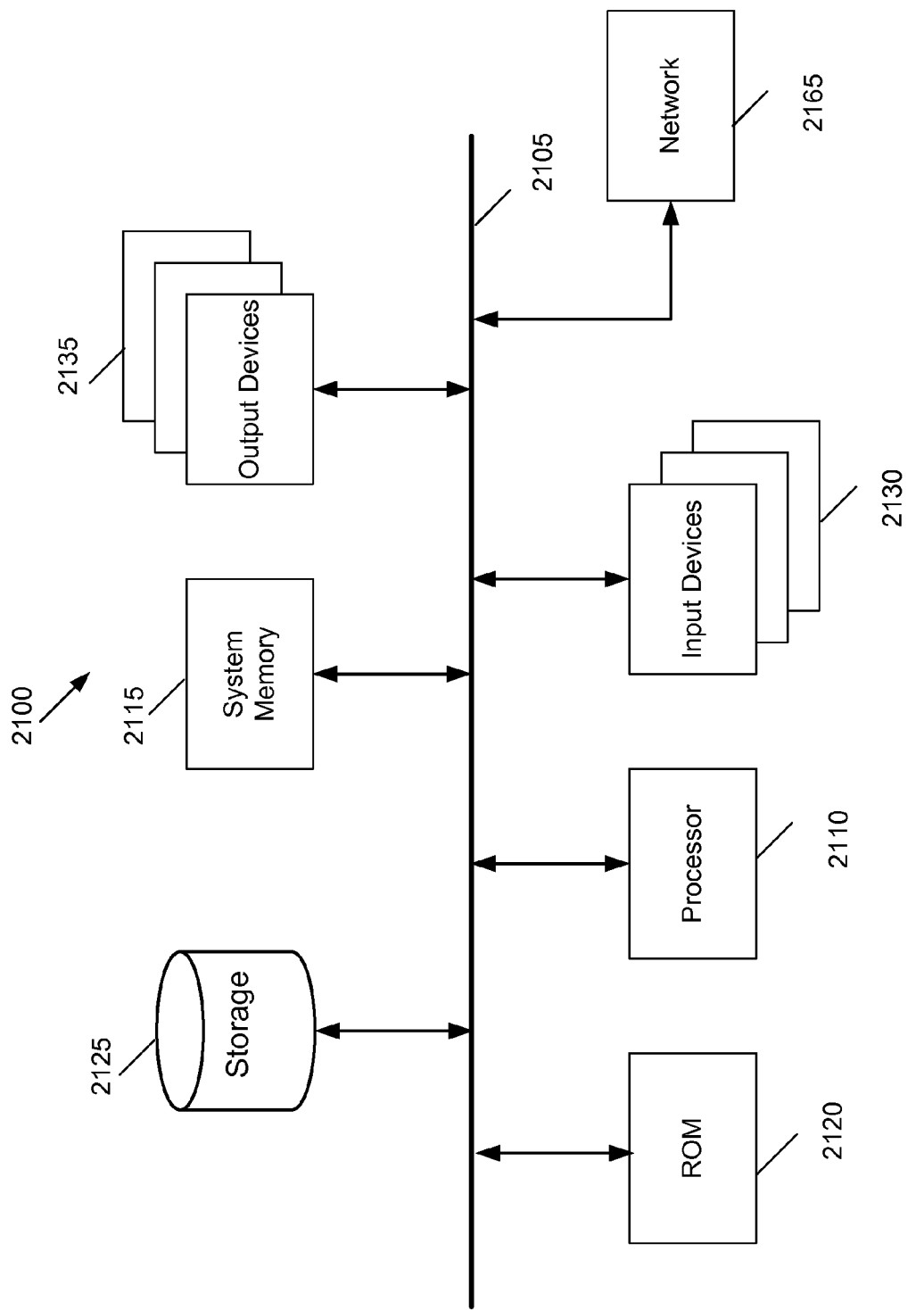
FIG. 21 illustrates a computer system with which some embodiments of the invention are implemented.

FIG. 21 is a block diagram of an illustrative computing system 2100 suitable for implementing an embodiment of the present invention. Computer system 2100 includes a bus 2106 or other communication mechanism for communicating information, which interconnects subsystems and devices, such as processor 2110, system memory 2115 (e.g., RAM), static storage device 2120 (e.g., ROM), disk drive 2125 (e.g., magnetic or optical), communication interface 2165 (e.g., wireless 802.11b/g or Ethernet card), input device 2130 (e.g., keyboard or cursor control), and output device 2135 (e.g., display monitor).

According to one embodiment, computer system 2100 performs specific operations by processor 2110 executing one or more sequences of one or more instructions contained in system memory 2115. Such instructions may be read into system memory 2115 from another computer readable/usable medium, such as static storage device 2120 or disk drive 2125. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium", "computer readable storage medium", or "computer usable medium" as used herein refers to any tangible medium that participates in providing instructions to processor 2110 for execution. Such a medium may take many forms, including but not limited to, non-volatile media and volatile media. Non-volatile media includes, for example, optical or magnetic disks, such as disk drive 2125. Volatile media includes dynamic memory, such as system memory 2115. Common forms of computer readable media includes, for example, floppy disk, flexible disk, hard disk, magnetic tape, any other magnetic medium, DVD-ROM, DVD-RAM, CD-ROM, any other optical medium, RAM, PROM, EPROM, FLASH-EPROM, any other memory chip or cartridge, or similar tangible medium from which a computer can read.

In an embodiment of the invention, execution of the sequences of instructions to practice the invention is performed by a single computer system 2100. According to other embodiments of the invention, two or more computer systems 2100 coupled by the communication interface 2165 (e.g., LAN, PTSN, or wireless network) may perform the sequence of instructions required to practice the invention in coordination with one another.

Computer system 2100 may transmit and receive messages, data, and instructions, including program, i.e., application code, through the communication interface 2165. Received program code may be executed by processor 2110 as it is received, and/or stored in disk drive 2125, or other non-volatile storage for later execution.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. For a security access manager of a data management system of an enterprise, a method of authenticating and authorizing a user of a client application to access secure data resources, said method comprising:
  providing a first security module for (i) receiving, from the client application which authenticates an identity of the user against an external user directory that operates outside of the data management system, a request comprising the identity of the user, (ii) accessing the external user directory, and (iii) verifying the identity against the external user directory;
  providing a second security module for performing a first level authorization upon verification of the identity by (i) accessing an external role repository that operates outside of the data management system, (ii) retrieving an enterprise role associated with the identity from the external role repository, and (iii) associating the enterprise role with an internal role that provides access to a set of secured data resources; and
  providing a third security module for performing a second level authorization upon performing the first level authorization by (i) retrieving a set of internal policy definitions and (ii) restricting access to a subset of the set of secured resources using the set of internal policy definitions,
  wherein said first, second, and third security modules are modules of the security access manager.

2. The method of claim 1, wherein a security hierarchy comprises a plurality of different levels of security operations that includes authentication services at one level and authorization services at another level.

3. The method of claim 1, wherein the first security module comprises an adapter module that translates a messaging format of the security access manager to a messaging format of the external user directory.

4. The method of claim 1, wherein the identity is part of authentication information that is included in the request, wherein the first module verifies the authentication information by accessing the external user directory.

5. The method of claim 1, wherein the first security module performs a first level authentication, the method further comprising providing a fourth security module for performing a second level authentication by accessing an internal user directory using the identity.

6. The method of claim 5, wherein the fourth security module performs the second level authentication when the first security module fails to verify the identity against the external user directory.

7. The method of claim 1, wherein the data management system comprises a user data store, wherein the second security module is further for accessing the user data store and retrieving the internal role from the user data store in order to associate the enterprise role with the internal role.

8. The method of claim 1, wherein the data management system comprises an internal policy store, wherein the third security module is further for accessing the internal policy store to retrieve the set of internal policy definitions.

9. The method of claim 1, wherein the external user directory is part of a security system developed by a third party developer independent of the data management system.

10. The method of claim 1, wherein the external user directory is part of a security system that does not pre-exist within the enterprise and is integrated into the security access manager to provide security services in addition to services deployed by the security access manager.

11. For a security access manager of a data management system of an enterprise, a method of authenticating and authorizing a user of a client application to access secure data resources of the enterprise, said method comprising:
  receiving a request from the client application that authenticates an identity of the user against an external user directory;
  verifying an external authentication against the external user directory;
  performing a first level authorization upon verifying the external authentication by (i) accessing an external role repository that operates outside of the data management system, (ii) retrieving an enterprise role associated with the identity from the external role repository, and (iii) associating the enterprise role with an internal role that provides access a set of secured resources; and performing a second level authorization upon performing the first level authorization by (i) retrieving a set of internal policy definitions and (ii) restricting access to a subset of the set of secured resources using the set of internal policy definitions, wherein the receiving, verifying, and performing the first and second level authorizations are operations of the security access manager.

12. The method of claim 11 further comprising accessing the external user directory using the identity of the user in order to verify the external authentication.

13. The method of claim 11, wherein the security access manager is a part of data management system that manages data resources.

14. The method of claim 11, wherein the external user directory is not a part of the data management system.

15. The method of claim 11, wherein the security access manager is a first security system, the method further comprising directing a different second security system to process a first subset of security operations when the first security system successfully processes a second subset of the security operations.

16. The method of claim 15, wherein the first subset of security operations comprises authentication, and wherein the second subset of the security operations comprises authorization.

17. The method of claim 11, wherein the set of secured resources is a first set of data resources, wherein the internal role restricts access to a second set of data resources.

18. The method of claim 11, wherein the set of secured resources is a first set of data resources, wherein the set of internal policy definitions restricts access to a second set of data resources.

19. The method of claim 13, wherein the data management system comprises a Customer Relationship Management (CRM) system of the enterprise, and said security access manager manages access to data resources of said CRM system.

20. The method of claim 13, wherein the data management system comprises an Enterprise Resource Planning (ERP) system of the enterprise, and said security access manager manages access to data resources of said ERP system.

21. A non-transitory computer readable storage medium storing a computer program for authenticating and authorizing a user of a client application to access data resources of an enterprise, the computer program executable by at least one processing unit, the computer program comprising sets of instructions for:

receiving, from the client application, a request comprising authentication information with an identity of the user;

performing a first level authentication of the identity by accessing a first user directory using the authentication information;

performing a second level authentication of the identity upon failure of the first level authentication by accessing a second user directory using the authentication information;

performing a first level authorization upon authenticating the identity by assigning a role that provides access to a set of secured resources; and performing a second level authorization by restricting access to a subset of the set of resources according to a set of internal policy definitions.

22. The non-transitory computer readable storage medium of claim 21, wherein the set of instructions for performing the first level authorization comprises a set of instructions for accessing a role repository to assign the role.

23. For a security access manager of a data management system of an enterprise, a method of authenticating and authorizing a user of a client application to access secure data resources, said method comprising:

providing a first security module to (i) receive, from the client application, a request comprising authentication information with an identity of the user and (ii) perform a first level authentication of the identity by accessing a first user directory using the authentication information;

providing a second security module to perform a second level authentication of the identity upon failure of the first level authentication by accessing a second user directory using the authentication information;

providing a third security module to perform a first level authorization upon authenticating the identity by assigning a role that provides access to a set of secured resources; and providing a fourth security module to perform a second level authorization operation upon performing the first level role authorization by restricting access to a subset of the set of secured resources according to a set of internal policy definitions, wherein said first, second, third, and fourth security modules are modules of the security access manager.

24. The method of claim 23, wherein the role is an internal role defined within the data management system, wherein the third security module performs the first level authorization by mapping a role definition of an enterprise security system to the internal role.

* * * * *